(12) United States Patent
Dickens, III et al.

(10) Patent No.: US 11,139,959 B2
(45) Date of Patent: Oct. 5, 2021

(54) STREAM CIPHERS FOR DIGITAL STORAGE ENCRYPTION

(71) Applicant: The University of Chicago, Chicago, IL (US)

(72) Inventors: Bernard Dickens, III, Chicago, IL (US); Haryadi Gunawi, Chicago, IL (US); Ariel Feldman, Chicago, IL (US); Henry Hoffmann, Chicago, IL (US)

(73) Assignee: The University of Chicago, Chicago, IL (US)

( * ) Notice: Subject to any disclaimer, the term of this patent is extended or adjusted under 35 U.S.C. 154(b) by 427 days.

(21) Appl. No.: 16/264,991

(22) Filed: Feb. 1, 2019

(65) Prior Publication Data
US 2019/0238312 A1 Aug. 1, 2019

Related U.S. Application Data

(60) Provisional application No. 62/625,148, filed on Feb. 1, 2018.

(51) Int. Cl.
*H04L 29/06* (2006.01)
*H04L 9/06* (2006.01)
(Continued)

(52) U.S. Cl.
CPC .............. *H04L 9/065* (2013.01); *G06F 3/064* (2013.01); *G06F 3/0604* (2013.01);
(Continued)

(58) Field of Classification Search
CPC ..... H04L 9/065; H04L 9/0656; H04L 9/0861; H04L 9/0643; H04L 9/0618;
(Continued)

(56) References Cited

U.S. PATENT DOCUMENTS 4,316,055 A 2/1982 Feistel
6,862,354 B1 3/2005 McGrew et al.
(Continued)

FOREIGN PATENT DOCUMENTS

WO  WO-2017195324 A1 * 11/2017 ........... G06F 3/0604

OTHER PUBLICATIONS

"BUSE—A block device in user space for Linux", Github—acozzette / BUSE, 2 pages, downloaded from the Internet on Feb. 1, 2019.
(Continued)

*Primary Examiner* — John B King
(74) *Attorney, Agent, or Firm* — McDonnell Boehnen Hulbert & Berghoff LLP

(57) ABSTRACT

An embodiment involves receiving a request to write data to a memory unit. The memory unit is divided into one or more logical blocks, each subdivided into groups of sub-blocks encrypted in accordance with a stream cipher. The memory unit maintains a transaction journal that marks each sub-block as dirty or clean. The memory unit stores keycount values for each of the logical blocks. The embodiment also involves: determining that the request seeks to write a portion of the data to a particular sub-block marked as dirty in the transaction journal, decrypting the particular logical block in accordance with the stream cipher, writing the portion of the data to the particular sub-block, incrementing the keycount value of the particular logical block, encrypting the particular logical block using the stream cipher, a key, and the keycount value, and writing the particular logical block to the memory unit.

20 Claims, 18 Drawing Sheets

(51) Int. Cl.
  *H04L 9/08* (2006.01)
  *G06F 21/60* (2013.01)
  *G06F 3/06* (2006.01)
  *G06F 16/18* (2019.01)

(52) U.S. Cl.
  CPC .......... *G06F 3/0659* (2013.01); *G06F 3/0673* (2013.01); *G06F 16/1815* (2019.01); *G06F 21/602* (2013.01); *H04L 9/0618* (2013.01); *H04L 9/0643* (2013.01); *H04L 9/0656* (2013.01); *H04L 9/0861* (2013.01); *H04L 2209/38* (2013.01)

(58) Field of Classification Search
  CPC . H04L 2209/38; G06F 21/602; G06F 3/0673; G06F 16/1815; G06F 3/0604; G06F 3/064; G06F 3/0659; G06F 21/72
  See application file for complete search history.

(56) References Cited

U.S. PATENT DOCUMENTS

| | | | |
|---|---|---|---|
| 6,983,049 B2 | 1/2006 | Wee et al. | |
| 7,372,962 B2 | 5/2008 | Fujimoto et al. | |
| 8,300,824 B1* | 10/2012 | McGrew | H04W 12/033 380/277 |
| 9,313,023 B1* | 4/2016 | Murray | H04L 9/0618 |
| 2001/0002478 A1* | 5/2001 | Grun | G06F 3/0689 711/114 |
| 2002/0101995 A1* | 8/2002 | Hashimoto | G06F 21/72 380/277 |
| 2003/0037182 A1* | 2/2003 | Bentley | G06F 16/10 719/328 |
| 2011/0296440 A1 | 12/2011 | Laurich et al. | |
| 2012/0079175 A1* | 3/2012 | Flynn | G11C 7/1012 711/103 |
| 2012/0166576 A1 | 6/2012 | Orsini et al. | |
| 2012/0331088 A1 | 12/2012 | O'Hare et al. | |
| 2014/0297921 A1* | 10/2014 | Chang | G06F 3/064 711/103 |
| 2015/0052300 A1* | 2/2015 | Piekarski | G06F 3/0665 711/114 |
| 2015/0254104 A1* | 9/2015 | Kessler | G06F 3/0631 711/170 |
| 2018/0143765 A1* | 5/2018 | Piekarski | G06F 3/0689 |
| 2019/0107949 A1* | 4/2019 | Piekarski | G06F 3/0667 |

OTHER PUBLICATIONS

"Full-Disk Encryption—Android Open Source Project", https://web.archive.org/web/20171203224317/https://source.android.com/security/encryption/full-disk, printed Feb. 1, 2019, 13 pages.
Bernstein, "The Poly1305-AES message-authentication code", Department of Mathematics, Statistics, and Computer Science, The University of Illinois at Chicago, 2005, 18 pages.
Bernstein, "ChaCha, a variant of Salsa20", Department of Mathematics, Statistics, and Computer Science, The University of Illinois at Chicago, 2008, 6 pages.
Chakraborty et al., "STES: A Stream Cipher Based Low Cost Scheme for Securing Stored Data", downloaded from the Internet on Feb. 1, 2019.
Cornwell, "Anatomy of a Solid-state Drive", ACM, 2012, 7 pages, downloaded from the Internet on Feb. 1, 2019.
Van Dijk et al., "Offline Untrusted Storage with Immediate Detection of Forking and Replay Attacks", ACM, STC 2007, 8 pages.
"eSTREAM: the ECRYPT Stream Cipher Project", The eSTREAM Portfolio, last updated Mar. 2012, http://www.ecrypt.eu.org/stream, 1 page.
Ferraiuolo et al., "Verification of a Practical Hardware Security Architecture Through Static Information Flow Analysis", ACM, ASPLOS 2017, 555-568.
"Trusted Platform Module (TPM) Summary", Trusted Computing Group, 2008, 3 pages.
Halevi et al., "A Tweakable Enciphering Mode", Advances in Cryptology—CRYPTO '03, Lecture Notes in Computer Science, vol. 2729, 2003, 33 pages.
Hein et al., "Secure Block Device—Secure, Flexible, and Efficient Data Storage for ARM TrustZone Systems", IEEE, 2015, 222-229.
Hicks et al., "SPECS: A Lightweight Runtime Mechanism for Protecting Software from Security-Critical Processor Bugs", ACM, ASPLOS 2015, 517-529.
Kirovski et al., "Enabling Trusted Software Integrity", ACM, ASPLOS 2002, 13 pages.
Kinoshi et al., "The Linux Implementation of a Log-structured File System", ACM SIGOPS Operating Systems Review, vol. 40 Issue 3, Jul. 2006, 102-107.
Lee et al., "F2FS: A New File System for Flash Storage", Proceedings of the 13th USENIX Conference on File and Storage Technologies (FAST '15), 2015, 273-286.
Li et al., "Sapper: A Language for Hardware-Level Security Policy Enforcement", ACM, ASPLOS 2014, 15 pages.
"ARM Security Technology: Building a Secure System using TrustZone Technology", ARM Limited, 2005-2009, 108 pages.
Cryptsetup: Cryptsetup and LUKS—open-source disk encryption, https://web.archive.org/web/20170915104800/https://gitlab.com/cryptsetup/cryptsetup, Apr. 7, 2015-Jan. 12, 2019, 4 pages.
Oracle Jeff Bonwick's Blog, "ZFS End-to-End Data Integrity", https://blogs.oracle.com/bonwick/zfs-end-to-end-data-integrity, 2005, 6 pages.
Dworkin, "Recommendation for Block Cipher Modes of Operation: The XTS-AES Mode for Confidentiality on Storage Devices", National Institute of Standards and Technology, 2010, 12 pages.
Reddy et al., "Mobile Secure Data protection using eMMC RPMB Partition", International Conference on Computing and Network Communications, IEEE, 2015, 946-950.
Device-mapper Resource Page, https://web.archive.org/web/20171222014802/https://sourceware.org/dm/, Apr. 8, 2005-Dec. 22, 2018, 2 pages.
Rogaway et al., "Efficient Instantiations of Tweakable Blockciphers and Refinements to Modes OCB and PMAC", 2004, 30 pages.
Rosenblum et al., "The Design and Implementation of a Log-Structured File System", paper appearing in Proceedings of the 13th ACM Symposium on Operating Systems Principles and Feb. 1992 ACM Transactions on Computer Systems, 1991, 15 pages.
Sarkar, "Tweakable Enciphering Schemes From Stream Ciphers With IV", Applied Statistics Unit, Kolkata, India, 12 pages, downloaded from the Internet Feb. 1, 2019.
GlobalPlatform Device Technology: TEE Client API Specification Version 1.0, 2010, 58 pages.
IEEE P1619™/D16: Standard for Cryptographic Protection of Data on Block-Oriented Storage Devices, 2007, 38 pages.
Tiwari et al., "Crafting a Usable Microkernel, Processor, and I/O System with Strict and Provable Information Flow Security", ACM, 2011, 11 pages.
ImperialViolet: TLS Symmetric Crypto, 2014, 5 pages.
Inspection-Resistant Memory Architectures, IEEE, 2013, 21 pages.
Wang et al., "HCTR: A Variable-Input-Length Enciphering Mode", CISC, LNCS 3822, 2005, 175-188.
Xu et al., "Design and Implementation of Secure Embedded Systems Based on Trustzone", IEEE, 2008, 136-141.
Zhang et al., "Identifying Security Critical Properties for the Dynamic Verification of a Processor", ACM, ASPLOS 2017, 541-554.
JEDEC Standard, Embedded MultiMediaCard(e•MMC) e•MMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41), JESD84-A441, JEDEC Solid State Technology Association, 2010, 234 pages.

* cited by examiner

Algorithm 1: handling an incoming read request

Require: The read request is over a contiguous segment of the backing store

Require: $\ell, \ell' \leftarrow$ read request length

Require: $\aleph \leftarrow$ master secret

Require: $n_{index} \leftarrow$ first nugget index to be read

1: $data \leftarrow empty$

2: while: $\ell \neq 0$ do

3:      $k_{n_{index}} \leftarrow GenKey_{nugget}(n_{index}, \aleph)$

4:      Fetch nugget keycount $n_{kc}$ from Keycount Store.

5:      Calculate indices touched by request: $f_{first}, f_{last}$

6:      $n_{flakedat} \leftarrow ReadFlakes(f_{first}, ..., f_{last})$

7:      for $f_{current} = f_{first}$ to $f_{last}$ do

8:          $k_{current} \leftarrow GenKey_{flake}(k_{n_{index}}, f_{current}, n_{kc})$ 9:          $tag_{f_{current}} \leftarrow GenMac(k_{f_{current}}, n_{flakedat}[f_{current}])$ 10:          Verify $tag_{f_{current}}$ in Merkle Tree.

▷(*) denotes requested subset of nugget data

11:      $data \leftarrow data + Decrypt(*n_{flakedat}, k_{n_{index}}, n_{kc})$

12:      $\ell \leftarrow \ell - \|*n_{flakedat}\|$

13:      $n_{index} \leftarrow n_{index} + 1$

14: return $data$

Ensure: $\|data\| <= \ell'$

Ensure: $\ell = 0$

FIG. 6A

Algorithm 2: handling an incoming write request

Require: The write request is to a contiguous segment of the backing store

Require: $\ell, \ell' \leftarrow$ write requested length

Require: $\aleph \leftarrow$ master secret

Require: $data \leftarrow$ cleartext data to be written

Require: $n_{index} \leftarrow$ first nugget index to be affected

1: Increment secure counter: by 2 if recovering from a crash, else 1
2: while: $\ell \neq 0$ do
3:     Calculate indices touched by request: $f_{first}, f_{last}$
4:     if Transaction Journal entries for $f_{first}, ..., f_{last} \neq 0$ then
5:         Trigger rekeying procedure (see: Algorithm 3).
6:         continue
7:     Set Transaction Journal entries for $f_{first}, ..., f_{last}$ to 1
8:     $k_{n_{index}} \leftarrow GenKey_{nugget}(n_{index}, \aleph)$
9:     Fetch nugget keycount $n_{kc}$ from Keycount Store.
10:     for $f_{current} = f_{first}$ to $f_{last}$ do
11:         $n_{flakedat} \leftarrow empty$
12:         if $f_{current} == f_{first} \| f_{current} == f_{last}$ then
13:             $n_{flakedat} \leftarrow CryptedRead(FSIZE, \aleph, n_{index}@f_{offset})$
14:         $n_{flakedat} \leftarrow Encrypt(n_{flakedat}, k_{n_{index}}, n_{kc})$
15:         $k_{f_{current}} \leftarrow GenKey_{flake}(k_{n_{index}}, f_{current}, n_{kc})$
16:         $tag_{f_{current}} \leftarrow GenMac(k_{f_{current}}, n_{flakedat})$
17:         Update new $tag_{f_{current}}$ in Merkle Tree.
18:         $WriteFlake(f_{current}, n_{flakedat})$
19: $\triangleright(*)$ denotes requested subset of nugget data if applicable
20:     $\ell \leftarrow \ell - \|* n_{flakedat}\|$
21:     $n_{index} \leftarrow n_{index} + 1$
22: Update and commit metadata and headers

Ensure: $\ell = 0$

FIG. 6B

Algorithm 3: rekeying process.

Require: The original write applied to a contiguous backing store segment

Require: $\ell \leftarrow$ write requested length

Require: $\aleph \leftarrow$ master secret

Require: $data \leftarrow$ cleartext data to be written

Require: $n_{index} \leftarrow$ nugget rekeying target

▷ Read in and decrypt the entire nugget

1: $n_{nuggetdat} \leftarrow CryptedRead(NSIZE, \aleph, n_{index})$

2: Calculate indices touched by request: $f_{first}, f_{last}$

3: Write $data$ into $n_{nuggetdat}$ at proper offset with length $\ell$

4: Set Transaction Journal entries for $f_{first}, ..., f_{last}$ to 1

5: $k_{n_{index}} \leftarrow GenKey_{nugget}(n_{index}, \aleph)$

6: Fetch nugget keycount $n_{kc}$ from Keycount Store. Increment it by one.

7: $n_{nuggetdat} \leftarrow Encrypt(n_{nuggetdat}, k_{n_{index}}, n_{kc})$

8: Commit $n_{nuggetdat}$ to the backing store

▷ Iterate over all flakes in the nugget

9: for all flakes $f_{current}$ in $n_{index}$ do

10:    $k_{f_{current}} \leftarrow GenKey_{flake}(k_{n_{index}}, f_{current}, n_{kc})$ 11:    Copy $f_{current}$ data from $n_{nuggetdat} \rightarrow n_{flakedat}$ 12:    $tag_{f_{current}} \leftarrow GenMac(k_{f_{current}}, n_{flakedat})$ 13:    Update new $tag_{f_{current}}$ in Merkle Tree.

14: Update and commit metadata and headers.

FIG. 6C

STREAM CIPHERS FOR DIGITAL STORAGE ENCRYPTION

CROSS-REFERENCE TO RELATED APPLICATION

This application claims priority to U.S. provisional patent application No. 62/625,148, filed Feb. 1, 2018, which is hereby incorporated by reference in its entirety.

BACKGROUND

Full drive encryption (FDE) protects the privacy of data at rest. For mobile devices, maintaining data privacy is especially important, as these devices contain sensitive personal and financial data yet are easily lost or stolen. The current standard for securing data at rest is to use the Advanced Encryption Standard (AES) cipher in XOR-Encrypt-XOR Tweaked CodeBook with Ciphertext Stealing (XTS) mode (referred to herein as AES-XTS). However, employing AES-XTS can increase read/write latency by up to 3-5 times compared to unencrypted storage.

Authenticated encryption using stream ciphers, such as ChaCha20, is faster than using AES. Indeed, some entities now use a stream cipher for Secure HyperText Transport Protocol (HTTPS) connections to obtain better performance. Stream ciphers are not used for FDE, however, for reasons of confidentiality and performance. Regarding confidentiality, when applied naively to stored data, stream ciphers are vulnerable to attacks, including many-time pad and rollback attacks, that reveal plaintext by overwriting a secure storage location using the same key. Further, it has been assumed that adding the metadata required to resist these attacks would ruin the stream cipher's performance advantage. Thus, the conventional wisdom is that FDE necessarily incurs the overhead of AES-XTS or a similar technique.

SUMMARY

Two technological shifts in mobile device and other hardware overturn this conventional wisdom, enabling confidential, high-performance storage with stream ciphers. First, these devices commonly use Log-structured File Systems (LFSs) or functionally equivalent constructions in hardware/firmware and/or software to increase the lifetime of their flash memory devices (e.g. solid state drives (SSDs)). Second, mobile devices now support trusted hardware, such as Trusted Execution Environments (TEEs) and secure storage areas. The use of LFSs limits overwrites to the same drive sectors; most writes are simply appended to a log, reducing the opportunity for attacks based on overwrites. The presence of secure hardware means that drive encryption modules have access to persistent, monotonically increasing counters that can be used to prevent rollback attacks when overwrites do occur.

Given these trends, the embodiments herein introduce a new method for securing data at rest. These embodiments may be implemented as a drop-in replacement for AES-XTS-backed FDE modules (i.e., no interface changes). The primary challenge is that even with an LFS running above an SSD, filesystem blocks will occasionally be overwritten; e.g., by segment cleaning or garbage collection. The embodiments overcome this challenge by using a fast stream cipher for confidentiality and performance with MAC tags and a secure, persistent hardware counter to ensure integrity and prevent attacks. The result is a system design enabling the first confidential, high-performance drive encryption based on a stream cipher. Nonetheless, certain types of block ciphers that mimic aspects of stream ciphers or exhibit behavior that is in some ways similar to that of stream ciphers (e.g., AES-CTR) could advantageously employ the embodiments herein.

Experimental results establish that the embodiments disclosed herein, when compared to AES-XTS implementations, reduce read latencies by as much as a factor of 2 (with a 1.6× mean improvement), and achieve near parity or provide an improvement in observed write latencies in the majority of benchmarks (a 1.2× mean improvement). This write performance is attained despite having to maintain more metadata.

Furthermore, these advances are accompanied by a stronger integrity guarantee than AES-XTS. Whereas XTS mode only randomizes plaintext when the ciphertext is altered the embodiments herein provide the security of standard authenticated encryption.

Accordingly, a first example embodiment may involve receiving a request to write data to a memory unit. The memory unit may be divided into one or more logical blocks, each of the logical blocks subdivided into groups of sub-blocks. Each of the logical blocks maps to one or more physical sectors of the memory unit. Any of the sub-blocks being used to store information are encrypted in accordance with a stream cipher. The memory unit maintains a transaction journal that marks each sub-block as either dirty or clean. The memory unit stores keycount values for each of the logical blocks. A cryptography software module may perform steps including: determining that the request seeks to write a portion of the data to a particular sub-block of the groups of sub-blocks, determining that the particular sub-block is marked as dirty in the transaction journal, reading a particular logical block containing the particular sub-block from the memory unit, decrypting the particular logical block in accordance with the stream cipher, writing the portion of the data to the particular sub-block, incrementing the keycount value associated with the particular logical block, generating a key for the particular logical block in accordance with the stream cipher, encrypting the particular logical block using the stream cipher, the key, and the keycount value as incremented, and writing the particular logical block as encrypted to the memory unit.

In a second example embodiment, a method may be used to perform operations in accordance with the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts an algorithm for handling a request to read from encrypted storage, in accordance with example embodiments.

FIG. 6B depicts an algorithm for handling a request to write to encrypted storage, in accordance with example embodiments.

FIG. 6C depicts an algorithm for rekeying, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

The following embodiments describe architectural and operational aspects of example computing devices and systems that may employ the disclosed FDE implementations, as well as the features and advantages thereof.

Figure 1:
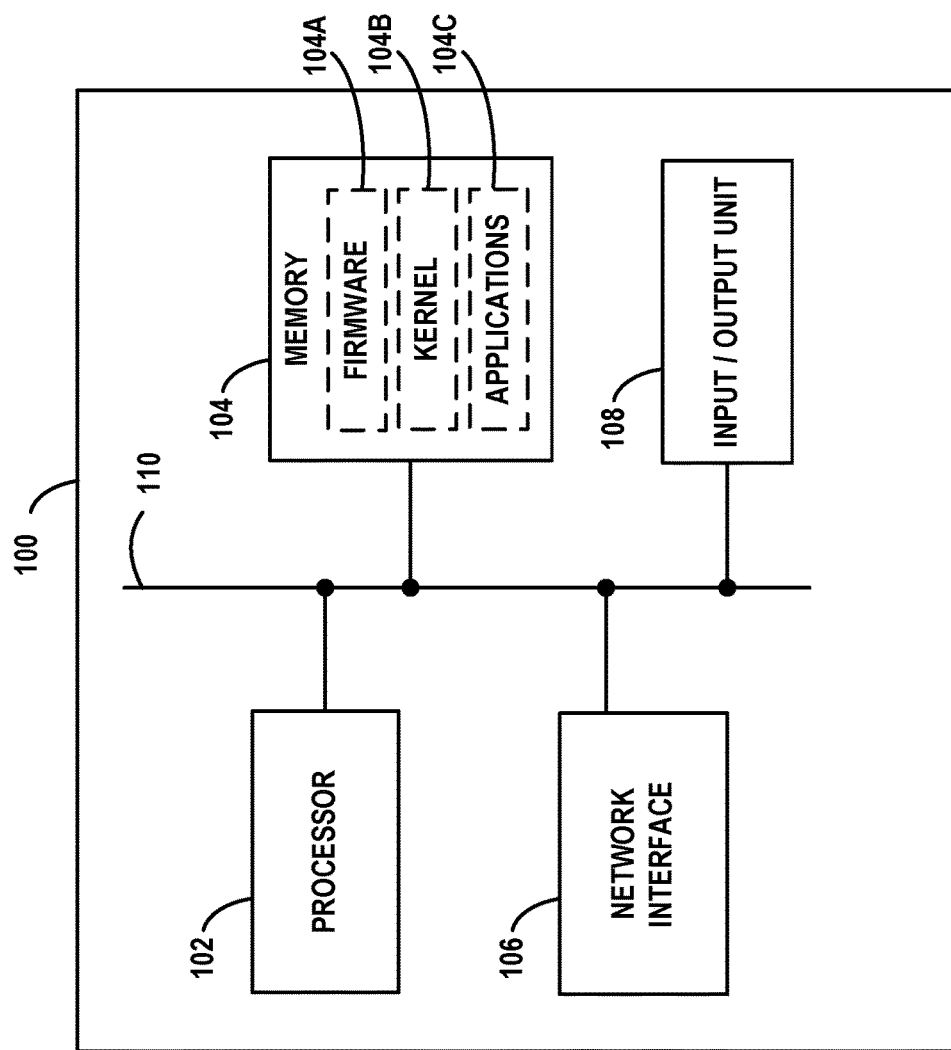
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
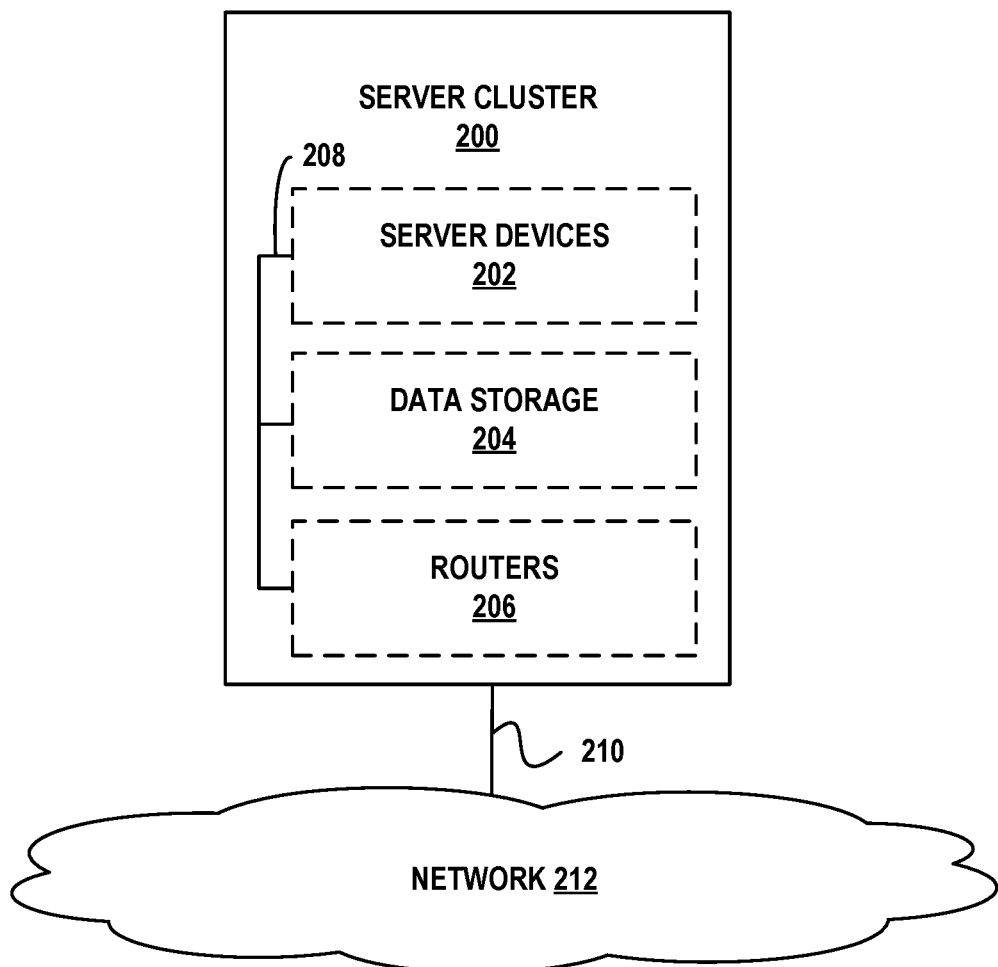
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Using Stream Ciphers with FDE

One of the motivations for the embodiments herein is the speed of stream ciphers compared to other types of ciphers, such as block ciphers. In general, block ciphers operate on fixed-length blocks of bits, each encoded using the same transformation and symmetric key. AES is an example of a block cipher. For FDE applications, various modifications to block ciphers has been proposed and put into use. As an example, XTS mode uses cipher block chaining (CBC) to combine (typically by way of an XOR operation) the previous block's ciphertext with the current block's plaintext. Thus, the decryption of one block depends on the decryption of all previous blocks. XTS mode also used different keys for encryption of the initial block and later blocks of the plaintext. In practice, however, XTS mode does not support detection of tampering in and of itself, and can be susceptible to traffic analysis, replay and randomization attacks.

In contrast, a stream cipher involves plaintext digits being combined with a pseudorandom cipher digit stream (referred to as a keystream). Each plaintext digit is encrypted with the corresponding digit of the keystream, to give a digit of the resulting ciphertext stream. Thus, encryption of each digit is dependent on the current state of the cipher (in some variations, the encryption may also depend upon previously-processed ciphertext digits). In practice, a digit is typically a bit and the combining operation is typically an XOR. The keystream can be generated serially from a random seed value using digital shift registers. The seed value serves as the cryptographic key for decrypting the ciphertext stream. To be secure, the keystream should be virtually indistinguishable from random noise.

Figure 3:
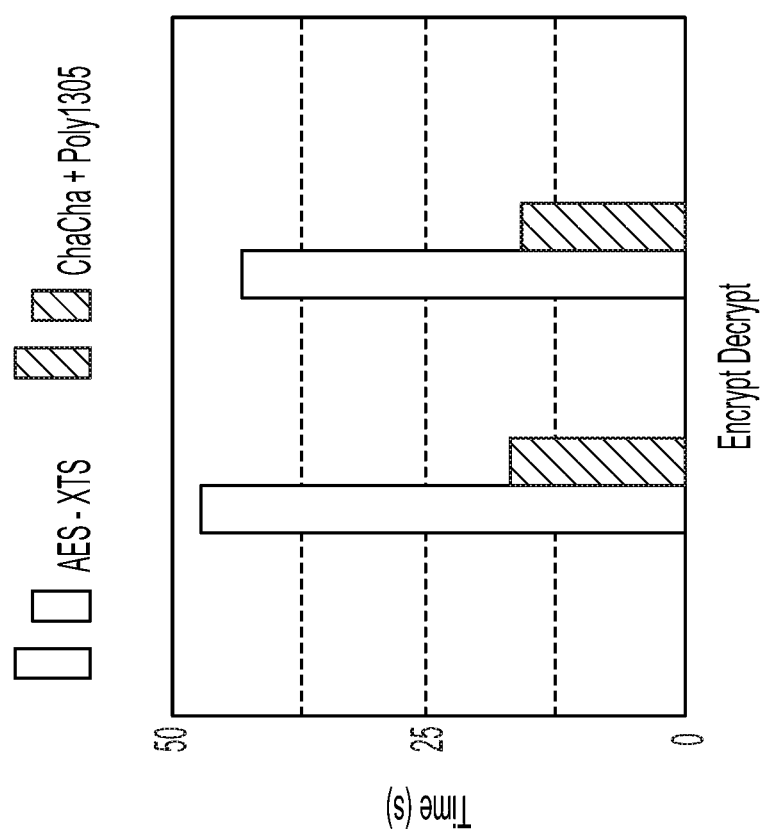
FIG. 3 depicts performance improvements of the embodiments herein over traditional file system structures.

One of the main advantages of stream ciphers over other types of ciphers is speed. An Exynos Octa processor with an ARM big.LITTLE architecture was used to compare AES-XTS to the stream cipher ChaCha20+Poly1305. Particularly, 250 megabytes of randomly-generated bits were encrypted and decrypted three times, and the median time for each of encryption and decryption was recorded. Use of the stream cipher resulted in a 2.7× reduction of run time, as illustrated in FIG. 3.

Still, stream ciphers are not designed to encrypt data at rest. In a naive implementation of FDE with a stream cipher, overwriting the same memory location with the same key would trivially allow an attacker to recover the secret key. Thus, stream ciphers may be better suited for encrypting block devices using Log-structured File Systems (LFSs).

A traditional file system writes files to a storage medium in order to leverage spatial and temporal locality-of-reference, as well as to be able to make in-place changes to data structures. On the other hand, an LFS divides the storage medium into segments and writes files to each segment in the form of logs. Rather than overwrite an existing location, the LFS places new writes at the end of the log, and reclaims storage space through garbage collection on older log entries. As a result, multiple versions of a file can be supported, and storage integrity activities after a crash are simpler.

Since LFSs are designed to append data to the end of a log rather than overwrite data, they are a good fit for stream ciphers, as it is highly unlikely that the same memory location would be overwritten using the same key. In practice, some overwrites occur; e.g., in metadata, but they are small in number during normal execution. Notably, although some of the embodiments herein and the associated experimental results assume an LFS, the embodiments can be used with and are likely to produce improvements when employed on other types of file systems as well.

As an example, 800 megabytes of random data was written directly to a memory module using four different file systems: Ext4, LogFS, NILFS, and F2FS. Ext4 is a journaling file system, whereas LogFS, NILFS, and F2FS are LFSs. A journaling file system provides a separate log for tracking changes in files, but overwrites files in place.

TABLE 1

| File System | Total Write Operations | Overwrites |
|---|---|---|
| Ext4 | 16,756 | 10,787 |
| LogFS | 4,244 | 32 |
| NILFS | 4,199 | 24 |
| F2FS | 2,107 | 2 |

The number of total writes to the underlying block device and the number of times data was overwritten for each file system was counted and is shown in Table 1. In the results, Ext4 exhibits the highest number of writes, but many of those are small writes for book-keeping purposes. Ext4 also has the largest number of overwrites, as almost 65% of the writes are to a previously written location in the backing store (here, the backing store is the underlying memory device). In contrast, all three log-structured file systems have very few overwrites.

Use of a stream cipher has the advantage of being more than twice as fast as AES-XTS, while providing the same confidentiality guarantee. The problem is that the stream cipher is not secure if the same key is used to overwrite the same storage location. Fortunately, the LFSs rarely overwrite the same location. This makes stream ciphers a good candidate for securing data stored in an LFS. Nonetheless, overwrites to an LFS do occur. While Table 1 shows overwrites are rare during normal operation, they will occur when garbage collecting the LFS. Thus, the embodiments here may use metadata to track writes and ensure that data is re-keyed if overwrites occur.

Overall, there are three main challenges to replacing AES with a stream cipher for FDE: (i) tracking writes to the memory to ensure that the same location is not overwritten with the same key, (ii) ensuring that the metadata that tracks these writes is secure and not subject to leaks or rollback attacks, (iii) accomplishing these tasks efficiently so that the performance advantage of the stream cipher is maintained.

These challenges can be met by using a secure, persistent counter supported in modern mobile hardware; e.g., for limiting password attempts. This counter can track writes, and thus versions of the encrypted data. If an attacker tried to roll back the file system to overwrite the same location with the same key, the implementation detects that the local version number is out of sync with the global version number stored in the secure counter. In that case, the system refuses to initialize, and the attack fails. The use of the hardware-supported secure counter significantly raises the bar when it comes to rollback attacks, requiring a costly and non-discrete physical attack on the hardware itself to be effective. Nonetheless, the actual structure of the metadata required to track writes and maintain integrity is more complicated than simply implementing a counter and is described in detail below.

An additional challenge is that of crash recovery. The embodiments herein rely on the overlying filesystem to manage data recovery in the event of a crash that leaves user data in an inconsistent state. Metadata recovery is addressed after a crash by giving the root user the option to accept the current metadata state as the new consistent state, i.e., "force mounting" the filesystem. An attacker might try to take advantage of this feature by modifying the memory, forcing an inconsistent state, and hoping the root user will ignore it and force mount the system anyway. The embodiments defend against this attack by preventing force mounts when the metadata state is wildly inconsistent with the global version counter. Otherwise, the root user is warned if they attempt a force mount. Thus, attacking by forcing a crash can only be successful if the attacker also has root permission, in which case security is already compromised.

III. Example Architecture

The embodiments herein act as a translation layer placed between the disk and the operating system. They provide confidentiality and integrity guarantees while mitigating performance loss due to metadata management overhead. This is accomplished by leveraging the speed of stream ciphers over the AES block cipher and taking advantage of the append-mostly nature of Log-Structured Filesystems (LFS) and modern Flash Translation Layers (FTL).

Hence, there are several locations where the implementation could be positioned in the system stack. It could be integrated into an LFS filesystem module itself, e.g., F2FS, specifically leveraging the flexibility of the Virtual Filesystem Switch (VFS). Alternatively or additionally, it could be implemented as an actual block device or virtual block device layered atop a physical block device (the latter is where the implementation described herein operates). Alternatively or additionally, it could even be implemented within the on-disk SSD controller managing the flash translation layer (scatter gather, garbage collection, wear-leveling, etc.).

Figure 4:
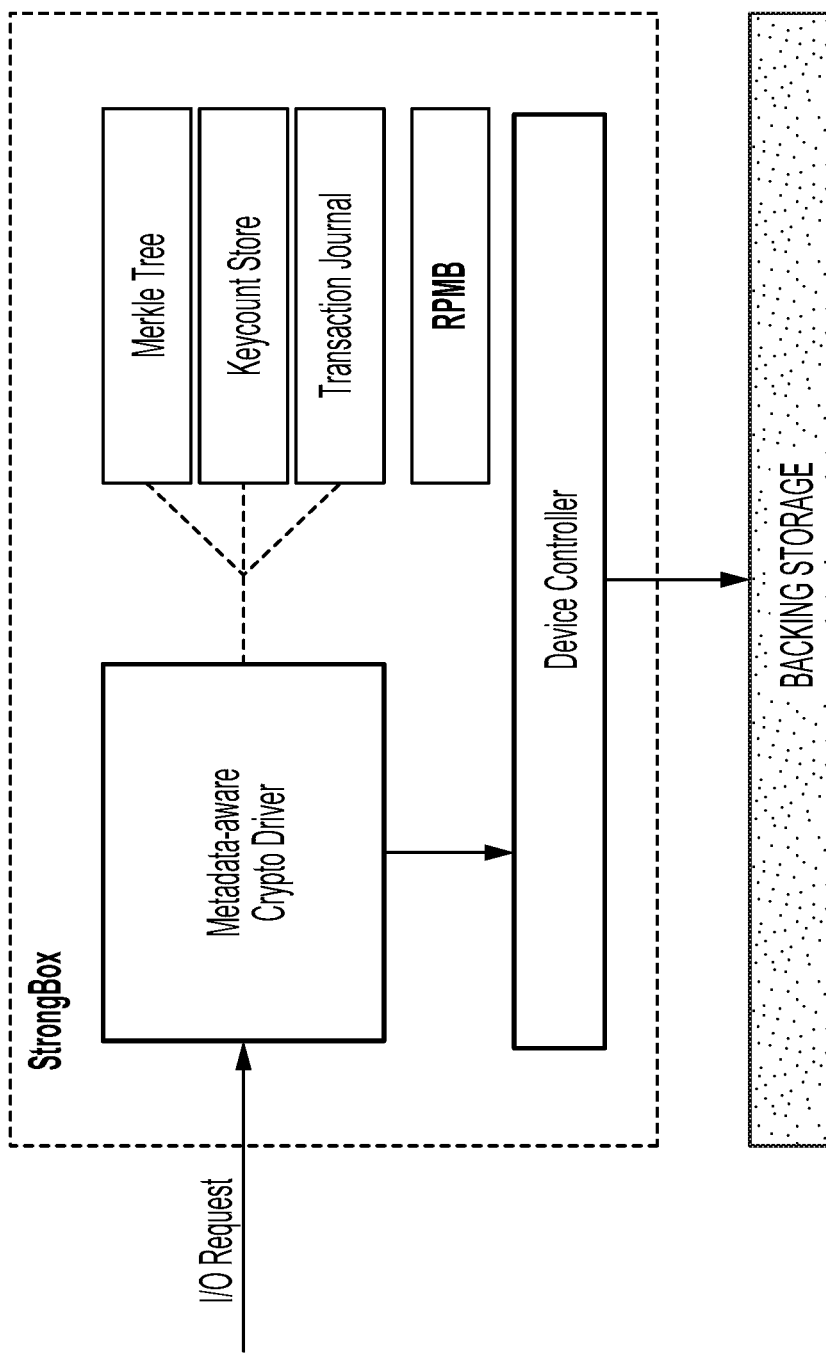
FIG. 4 is a block diagram representing an FDE mechanism, in accordance with example embodiments.

FIG. 4 depicts an example design. The metadata is encapsulated in four components: an in-memory Merkle Tree and two disk-backed byte arrays, the keycount store and the transaction journal, and a persistent monotonic counter (implemented with the replay protected memory block, or RPMB). All four are integrated with the Cryptographic Driver, which handles data encryption, verification, and decryption during interactions with the underlying backing store. These interactions take place while fulfilling high-level I/O requests received from the overlying LFS. The Device Controller handles low-level I/O between the Cryptographic Driver and the backing store.

A. Backing Store Function and Layout

Figure 5:
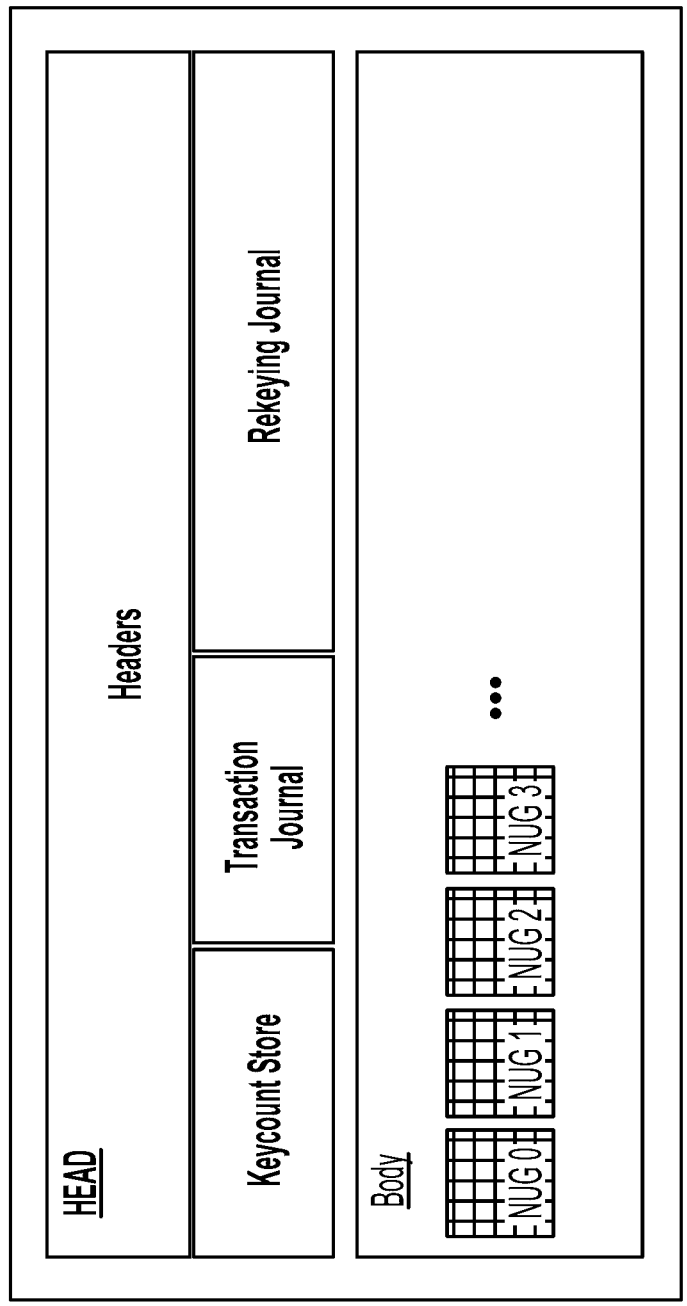
FIG. 5 is a block diagram representing a backing store of the FDE mechanism, in accordance with example embodiments.

FIG. 5 depicts a possible backing store layout. In the body section of the backing store, application data is partitioned into a series of same-size logical blocks. These logical blocks are distinct from the concept of physical disk blocks, which are collections of one or more disk sectors. To make this distinction clear, the logical blocks are referred to as nuggets, marked NUG in FIG. 5. Hence, a nugget consists of one or more physical disk blocks, depending on its configured size. Each nugget is subdivided into a constant number of sub-blocks referred to as flakes. The reason for these nugget/flake divisions are two-fold: (i) to limit the maximum length of any plaintext operated on by the cryptographic driver, decreasing the overhead incurred per I/O operation, and (ii) to track, detect, and handle overwrites.

When a request comes in to write to one or more flakes in a nugget, the affected flakes are marked "dirty." Here, the marking of dirty implies that another write to some portion of that flake would constitute an overwrite. If a new request comes in to write to one or more of those same flakes another time, a rekeying procedure over the entire nugget is triggered to safely overwrite the old data in those flakes. This rekeying procedure may be time consuming, adding to the overhead of overwrites.

TABLE 2

| Header | Length | Description |
| --- | --- | --- |
| VERSION | 4 bytes | Specifies the version of the encryption software used to initialize the backing store. |
| SALT | 16 bytes | The salt used in part to derive the global master secret. |
| MTRH | 32 bytes | Hash of the Merkle Tree root. |
| TPMGLOBALVER | 8 bytes | The monotonic global version count, in hardware-supported secure storage. |
| VERIFICATION | 32 bytes | Used to determine if the key derived from a password is correct. |
| NUMNUGGETS | 4 bytes | The number of nuggets contained by the backing store. |
| FLAKESPERNUGGET | 4 bytes | The number of flakes per nugget. |
| FLAKESIZE | 4 bytes | The size of each flake, in bytes. |
| INITIALIZED | 1 byte | Used to determine whether the backing store has been properly initialized. |
| REKEYING | 4 bytes | The index of the nugget in need of rekeying if there is a pending rekeying procedure. |

The head of the backing store contains the metadata written to disk during initialization. These headers govern operation and are described in more detail in Table 2. After the headers, two byte arrays are stored in the Head section. One is an array of N 8-byte integer keycounts and one of N [P/8] byte transaction journal entries, where N is the number of nuggets and P is the number of flakes per nugget. The Rekeying Journal is stored at the end of the Head section. The rekeying journal is where nuggets and their associated metadata are transiently written, so that rekeying can be resumed in the event that it is interrupted.

B. Metadata-Aware Cryptographic Driver

The cryptographic driver coordinates the system's disparate components. Its primary function is to map incoming reads and writes to their proper destinations in the backing store, applying the chosen stream cipher and message authentication code to encrypt, verify, and decrypt data on the fly with consideration for metadata management.

When a read request is received, it is first partitioned into affected nuggets; i.e., a read that spans two nuggets is partitioned in half. For each nugget affected, the flakes touched by the request are determined. Then, the contents of those flakes are verified. If all the flakes are valid, whatever subset of data that was requested by the user is decrypted and returned. Algorithm 1 as shown in FIG. 6A details the read operation.

Like reads, when a write request is received, the request is first partitioned with respect to affected nuggets. For each affected nugget, which flakes are touched by the request are determined. These flakes are checked if any are marked as dirty in the transaction journal. If one or more of them have been marked dirty, rekeying for these specific nuggets is triggered. Rekeying is detailed in Algorithm 3 in FIG. 6C. Otherwise, the touched flakes are marked as dirty in the transaction journal. Then, the touched flakes are iterated over. For the first and last flakes touched by the write request, an internal read request is executed (Algorithm 1 in FIG. 6A) to both obtain the flake data and verify that data with the Merkle Tree. Then, every touched flake is overwritten with the data from the requested operation, the Merkle Tree is updated to reflect this change, and the new flake data is written and encrypted. Then, all corresponding metadata is committed. Algorithm 2 in FIG. 6B details the write operation.

Herein, a Merkle Tree may be referred to as a hash tree. In such a tree, each leaf node contains a cryptographic hash of a flake, and every non-leaf node contains a cryptographic hash of its child nodes. This allows efficient verification of large amounts of data. The cryptographic hash may be any one-way function that maps an input bit string (potentially of arbitrary size) to an output bit string (potentially of fixed size). Regardless, the embodiments herein are not limited to using Merkle Trees or hash trees, and other types of data verification mechanisms may be used. For instance, an SHA-based c-struct implementation, a Tiger tree, a Fletcher-based tree of pointers, other Merkle Tree variations, or any other algorithm that can unify the state of all tags such that any change is immediately evident can be used.

1. Transaction Journal

An overwrite breaks the security guarantee offered by any stream cipher. To prevent this failure, the embodiments herein track incoming write requests to prevent overwrites. This tracking is done with the transaction journal of FIG. 4.

The transaction journal consists of N [P/8]-byte bit vectors, where N is the number of nuggets and P is the number of flakes per nugget. A bit vector v contains at least P bits=$b_0 b_1 b_2, \ldots, b_{P-1}, \ldots$, with extra bits ignored. Each vector is associated with a nugget and each bit with a flake belonging to that nugget. When an incoming write request occurs, the corresponding bit vector is updated (set to 1) to reflect the new dirty state of those flakes.

The transaction journal is referenced during each write request, where it is updated to reflect the state of the nugget and checked to ensure the operation does not constitute an overwrite. If the operation does constitute an overwrite, a rekeying procedure is triggered for the entire nugget before safely completing the request.

2. Merkle Tree

Tracking writes with the transaction journal may stymie a passive attacker by preventing explicit overwrites, but a sufficiently motivated active attacker could resort to all manner of cut-and-paste tactics with nuggets, flakes, and even blocks and sectors. If, for example, an attacker purposefully zeroed-out the transaction journal entry pertaining to a specific nugget in some out-of-band manner, such as when the system is shut down and then later re-initialized with the same backing store, the system would consider any successive incoming writes as if the nugget were in a completely clean state, even though it actually is not. This attack would force compromising overwrites. To prevent such attacks, it can be ensured that the backing store is always in a valid state. More concretely, there should be an integrity guarantee on top of a confidentiality guarantee.

The system uses a Message Authentication Code (MAC) algorithm and each flake's unique key to generate a per-flake MAC tag. Each tag is then appended to the Merkle Tree along with metadata. The transaction journal entries are handled specially in that the bit vectors are MACed and the result is appended to the Merkle Tree. This is done to save space.

3. Keycount Store

To prevent a many-time pad attack, each nugget is assigned its own form of nonce referred to as a keycount. The keycount store in FIG. 4 represents a byte-array containing N 8-byte integer keycounts indexed to each nugget. Along with acting as the per-nugget nonce consumed by the stream cipher, the keycount is used to derive the per-flake unique subkeys used in MAC tag generation.

4. Rekeying Procedure

When a write request would constitute an overwrite, the system triggers a rekeying process instead of executing the write normally. This rekeying process allows the write to proceed without causing a catastrophic confidentiality violation.

When rekeying begins, the nugget in question is loaded into memory and decrypted. The target data is written into its proper offset in this decrypted nugget. The nugget is then encrypted, this time with a different nonce (keycount+1), and written to the backing store, replacing the outdated nugget data. Algorithm 3 in FIG. 6C details this procedure.

C. Defending Against Rollback Attacks

To prevent making overwrites, the status of each flake is tracked and overwrites trigger a rekeying procedure. Tracking flake status alone is not enough, however. An attacker could take a snapshot of the backing store in its current state and then easily rollback to a previously valid state. At this point, the attacker could have the system make writes that it does not recognize as overwrites.

With AES-XTS, the threat posed by rolling the backing store to a previously valid state is outside of its threat model. Despite this, data confidentiality guaranteed by AES-XTS holds in the event of a rollback, even if integrity is violated. The embodiments herein use a monotonic global version counter to detect rollbacks. When a rollback is detected, the system refuses to initialize unless forced, using root permission. Whenever a write request is completed, this global version counter is committed to the backing store, committed to secure hardware, and updated in the in-memory Merkle Tree.

D. Recovering From Inconsistent State

If the system is interrupted during operation, the backing store—consisting of user data and metadata—can be left in an inconsistent state. The system relies on the overlying filesystem (e.g., F2FS) to manage user-data recovery, which is what these filesystems are designed to do and do well. The system handles its own inconsistent metadata.

Let c be the value of the on-chip monotonic global version counter and d be the value of the on-disk global version counter header (TPMGLOBALVER). Consider the following cases.

Case 1: c==d and MTRH is consistent: The system is operating normally and will mount without issue.

Case 2: c<d or c==d but MTRH is inconsistent: Since the global version counter is updated before any write, this case cannot be reached unless the backing store was manipulated by an attacker. So, the system refuses to initialize and cannot be force mounted.

Case 3: c>d+1: Since the global version counter is updated once per write, this case cannot be reached unless the backing store was rolled back or otherwise manipulated by an attacker. In this case, the root user is warned and the system refuses to initialize and cannot be force mounted unless the MTRH is consistent. The root user can force mount if the root user initiated the rollback themselves, such as when recovering from a disk backup.

Case 4:$c==d+1$: In this case, the system likely crashed during a write, perhaps during an attempted rekeying. If the rekeying journal is empty or the system cannot complete the rekeying and/or bring the MTRH into a consistent state, the root user is warned and allowed to force mount. Otherwise, the system will not initialize For subsequent rekeying efforts in the latter two cases, rather than incrementing the corresponding keystore counters by 1 during rekeying, they are incremented by 2. This is done to prevent potential reuse of any derived nugget keys that might have been in use right before the system crashed.

Thus, when the system can detect tampering, it will not initialize. When the system cannot distinguish between tampering and a crash, it offers the root user a choice to force mount. Thus, an attacker could force a crash and use root access to force mount. It is assumed, however, that if an attacker has root access to a device, its security is already compromised.

IV. Example Implementation

An example implementation of the embodiments described herein is comprised of 5000 lines of C code. Libraries used include OpenSSL version 1.0.2 and LibSodium version 1.0.12 for its ChaCha20, Argon2, Blake2, and AES-XTS implementations, likewise implemented in C. The SHA-256 Merkle Tree implementation is borrowed from the Secure Block Device library. To reduce the complexity of the experimental setup and allow execution in user space, a virtual device interface is provided through the BUSE virtual block device layer, itself based on the Network Block Device (NBD).

A. Deriving Subkeys

The cryptographic driver uses a shared master secret. The derivation of this master secret is implementation specific and has no impact on performance as it is completed during initialization. The implementation uses the Argon2 KDF to derive a master secret from a given password with an acceptable time-memory trade-off.

To assign each nugget its own unique keystream, each nugget uses a unique key and associated nonce. These nugget subkeys are derived from the master secret during initialization. To guarantee the backing store's integrity, each flake is tagged with a MAC. In this example implementation, the Poly1305 MAC is used, accepting a 32-byte one-time key and a plaintext of arbitrary length to generate tags. These one-time flake subkeys are derived from their respective nugget subkeys. In alternative embodiments, a hash-based message authentication code (HMAC), message authentication code based on universal hashing (UMAC), vhash-based message authentication code (VMAC), non-keyed hashing function (e.g., SHA2), or any other algorithm that can securely map a block of data to a unique tag could be used.

B. A Secure, Persistent, Monotonic Counter

The target platform uses an embedded Multi-Media Card (eMMC) as a backing store. In addition to boot and user data partitions, the eMMC standard includes a secure storage partition called a Replay Protected Memory Block (RPMB). The RPMB partition's size is configurable to be at most 16 megabytes (32 megabytes on some devices). All read and write commands issued to the RPMB are authenticated by a key burned into write-once storage (typically eFUSE) during a one-time, secure initialization process.

To implement rollback protection on top of the RPMB, the key for authenticating RPMB commands can be contained in TEE sealed storage or derived from the TPM. For this implementation, the system interacts with TPM/TEE secure storage only at mount time, where the authentication key can be retrieved and cached for the duration of the system's lifetime. With the cached key on hand, the implementation makes traditional IOCTL calls to read and write global version counter data to the RPMB eMMC partition, enforcing the invariant that it only increase monotonically.

The design is not dependent on the eMMC standard, however. Trusted hardware mechanisms other than the eMMC RPMB partition, including TPMs, support secure, persistent storage and/or monotonic counters directly. These can be adapted for use as well. Further, any interface that makes secure monotonic counters available can be used. For example, if a future operating system or hypervisor provided secure monotonic counters, that could be used instead.

There are two practical concerns to be addressed while implementing the secure counter: wear and performance overhead. Wear is a concern because the counter is implemented in non-volatile storage. The RPMB implements all the same wear protection mechanisms that are used to store user-data. Additionally, the system writes to the global version counter once per write to user-data. Given that the eMMC implements the same wear protection for the RPMB and user data, and that the ratio of writes to these areas is 1:1, it is expected that the system places no additional wear burden on the hardware. Further, with the JEDEC spec suggesting RPMB implementations use more durable and faster single-level NAND flash cells rather than cheaper and slower multi-level NAND flash cells, the RPMB partition will likely outlive and outperform the user-data portion of the eMMC.

In terms of performance overhead, updating the global version counter involves making one 64-bit authenticated write per user-data write. As user-data writes are almost always substantially larger, there is no significant overhead from the using the RPMB to store the secure counter.

C. LFS Garbage Collection

An LFS attempts to write to a drive sequentially in an append-only fashion, as if writing to a log. This requires large amounts of contiguous space, called segments. Since any backing store is necessarily finite, an LFS can only append so much data before it runs out of space. When this occurs, the LFS triggers a segment cleaning algorithm to erase outdated data and compress the remainder of the log into as few segments as possible. This procedure is known more broadly as garbage collection.

In the context of the embodiments herein, garbage collection could potentially incur high overhead. The procedure itself would, with its every write, require a rekeying of any affected nuggets. Worse, every proceeding write would appear to the system as if it were an overwrite, since there is no way for the system to know that the LFS triggered garbage collection internally.

In practice, modern production LFSes are optimized to perform garbage collection as few times as possible. Further, they often perform garbage collection in a background thread that triggers when the filesystem is idle and only perform expensive on-demand garbage collection when the backing store is nearing capacity. Garbage collection was turned on for all tests and there was no substantial performance degradation from this process because it is scheduled not to interfere with user I/O.

D. Overhead

The system stores metadata on the drive it is encrypting (see FIG. 5). This metadata should be small compared to the user data. The implementation uses 4-kilobyte flakes, 256 flakes/nugget, and 1024 nuggets per gigabytes of user data.

Given the flake and nugget overhead, this configuration requires just over 40 kilobytes of metadata per 1 gigabyte of user data. There is an additional, single static header that requires just over 200 bytes. Thus, the system's overhead in terms of storage is less than one hundredth of a percent.

V. Experimental Evaluation

A. Setup

A prototype was implemented on a Hardkernel Odroid XU3 ARM big.LITTLE system (Samsung Exynos 5422 A15 and A7 quad core CPUs, 2 gigabytes of LPDDR3 RAM, eMMC5.0 HS400 backing store) running Ubuntu Trusty 14.04 LTS, kernel version 3.10.58.

B. Methodology

To evaluate the performance of the embodiments herein, the latency (seconds/milliseconds per operation) of both sequential and random read and write I/O operations across four different standard Linux filesystems was measured. These filesystems are NILFS2, F2FS, Ext4 in ordered journaling mode, and Ext4 in full journaling mode. The I/O operations were performed using file sizes between 4 kilobytes and 40 megabytes. These files were populated with random data. The experiments were performed using a standard Linux ramdisk (tmpfs) as the ultimate backing store.

Ext4's default mode is ordered journaling mode (data=ordered), where metadata is committed to the filesystem's journal while the actual data is written through to the main filesystem. In the case of a crash, the filesystem uses the journal to avoid damage and recover to a consistent state. Full journaling mode (data journal) journals both metadata and the filesystem's actual data—essentially a double writeback for each write operation. In the case of a crash, the journal can replay entire I/O events so that both the filesystem and its data can be recovered. Both modes of Ext4 were considered to further explore the impact of frequent overwrites.

The experiment consists of reading and writing each file in its entirety 30 times sequentially, and then reading and writing random portions of each file 30 times. In both cases, the same amount of data is read and written per file. The median latency is taken per result set. The choice of 30 read/write operations (10 read/write operations repeated three times each) was to handle potential variation. The Linux page cache is dropped before every read operation, each file is opened in synchronous I/O mode via O_SYNC, and non-buffered read( )/write( ) system calls were used. A high-level I/O size of 128 kilobytes was used for all read and write calls that impact the filesystems; however, the I/O requests being made at the block device layer varied between 4 kilobytes and 128 kilobytes depending on the filesystem under test.

The experiment was repeated on each filesystem in three different configurations. The first configuration is unencrypted. The filesystem is mounted atop a BUSE virtual block device set up to immediately pass through any incoming I/O requests straight to the backing store. This is the baseline measurement of the filesystem's performance without any encryption. The second configuration uses the embodiments herein. The filesystem is mounted atop a BUSE virtual block device, provided by the implementation described above, to perform full-disk encryption. The third configuration uses dm-crypt. The filesystem is mounted atop a Device Mapper higher-level virtual block device provided by dm-crypt to perform full-disk encryption, which itself is mounted atop a BUSE virtual block device with pass through behavior identical to the device used in the baseline configuration. The dm-crypt module was configured to use AES-XTS as its full-disk encryption algorithm. All other parameters were left at their default values.

Figure 7A:
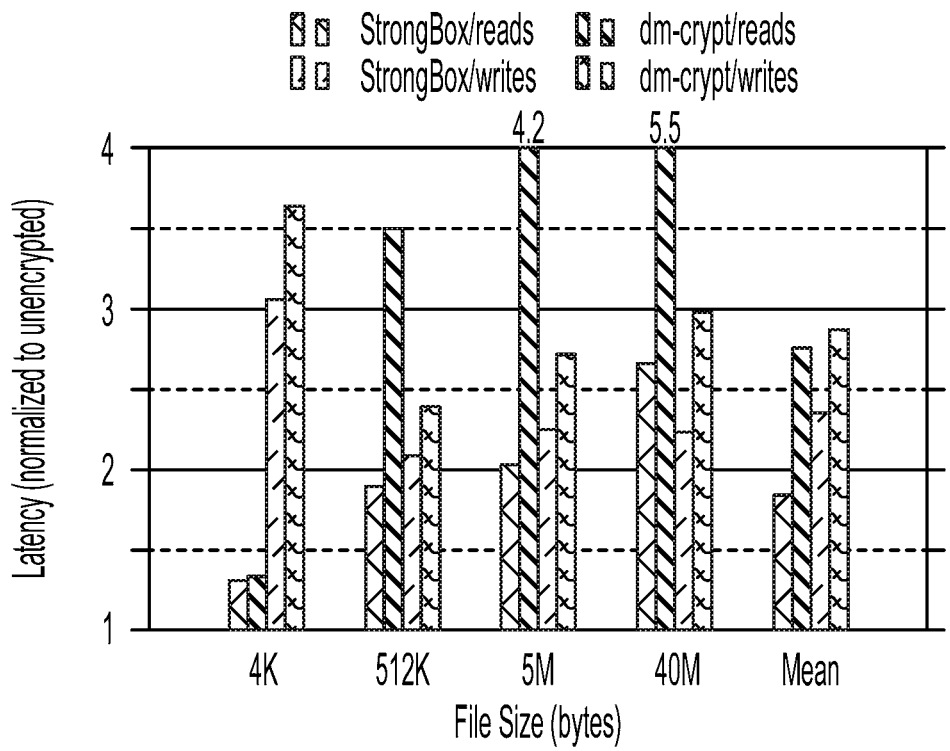
FIG. 7A illustrates performance results, in accordance with example embodiments.
Figure 7B:
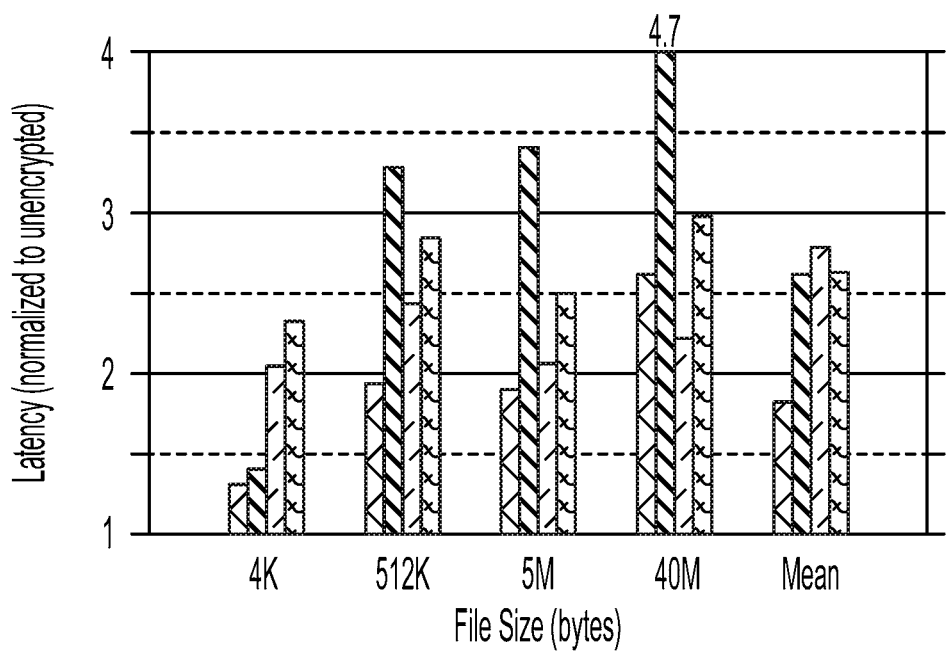
FIG. 7B illustrates performance results, in accordance with example embodiments.

FIGS. 7A and 7B compare the embodiments herein to dm-crypt under the F2FS filesystem. The gamut of result sets over different filesystems can be seen in FIG. 8A-8D. FIGS. 9A and 9B compare Ext4 with dm-crypt to F2FS with the embodiments herein. In these figures, an implementation of the embodiments herein is referred to as "StrongBox". However, other implementations are possible.

C. Read Performance

FIGS. 7A and 7B show the read performance of the embodiments herein in comparison to dm-crypt, both mounted with the F2FS filesystem. The disclosed embodiments improve on the performance of dm-crypt's AES-XTS implementation across sequential and random read operations on all file sizes. Specifically, the improvements are 2.07× for sequential 40-megabyte reads, 2.08× for sequential 5-megabyte reads, 1.85× for sequential 512-kilobyte reads, and 1.03× for sequential 4-kilobyte reads.

Figure 8A:
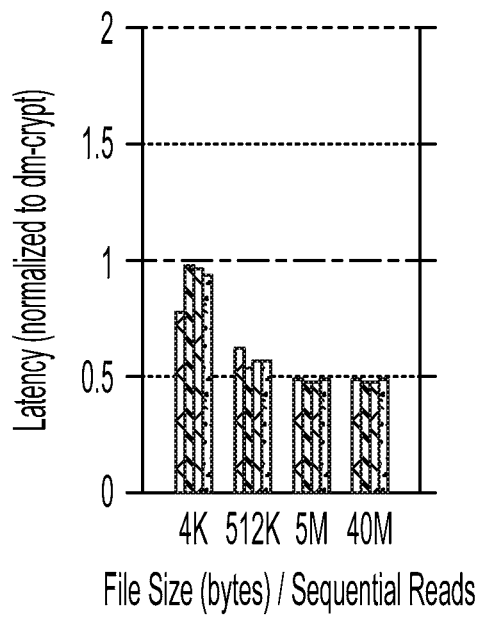
FIG. 8A illustrates performance results, in accordance with example embodiments.
Figure 8B:
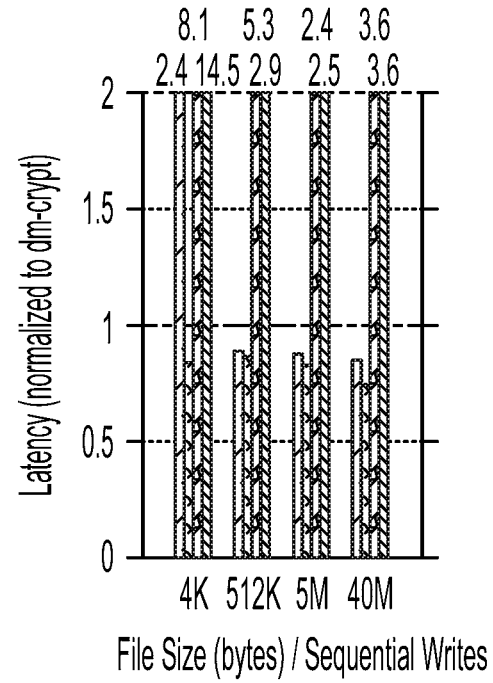
FIG. 8B illustrates performance results, in accordance with example embodiments.
Figure 8C:
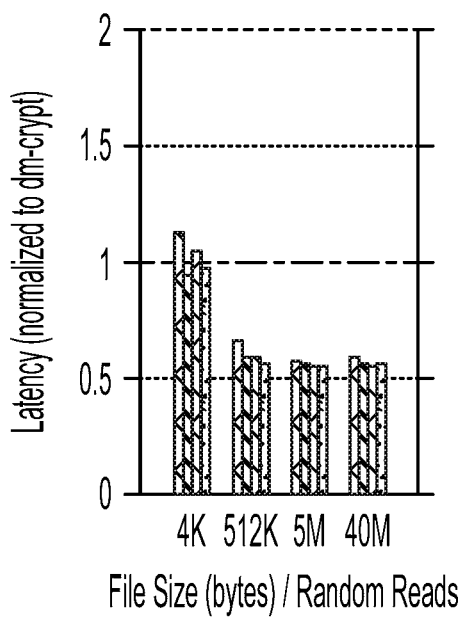
FIG. 8C illustrates performance results, in accordance with example embodiments.
Figure 9A:
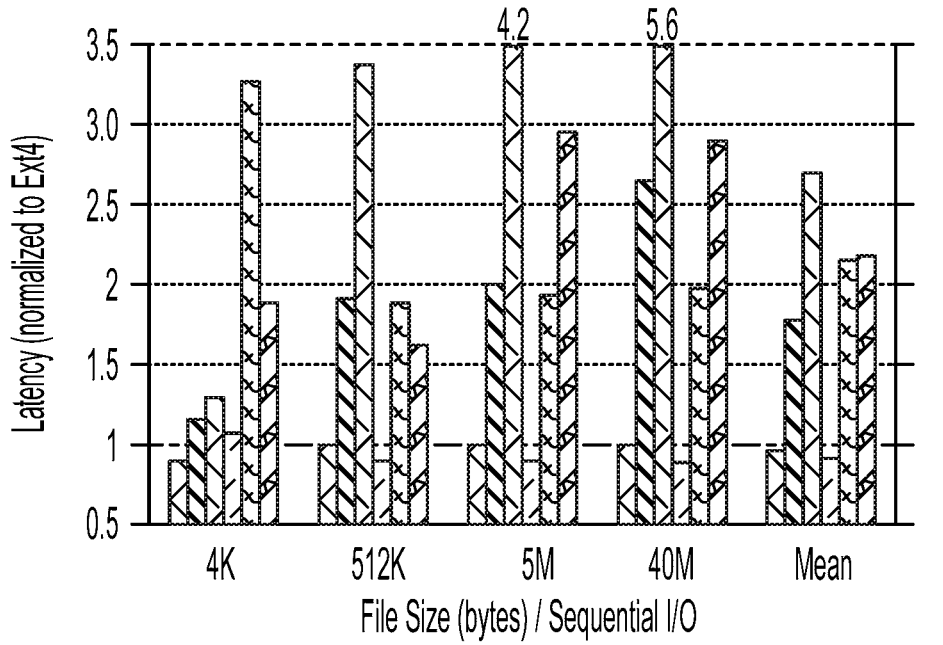
FIG. 9A illustrates performance results, in accordance with example embodiments.
Figure 9B:
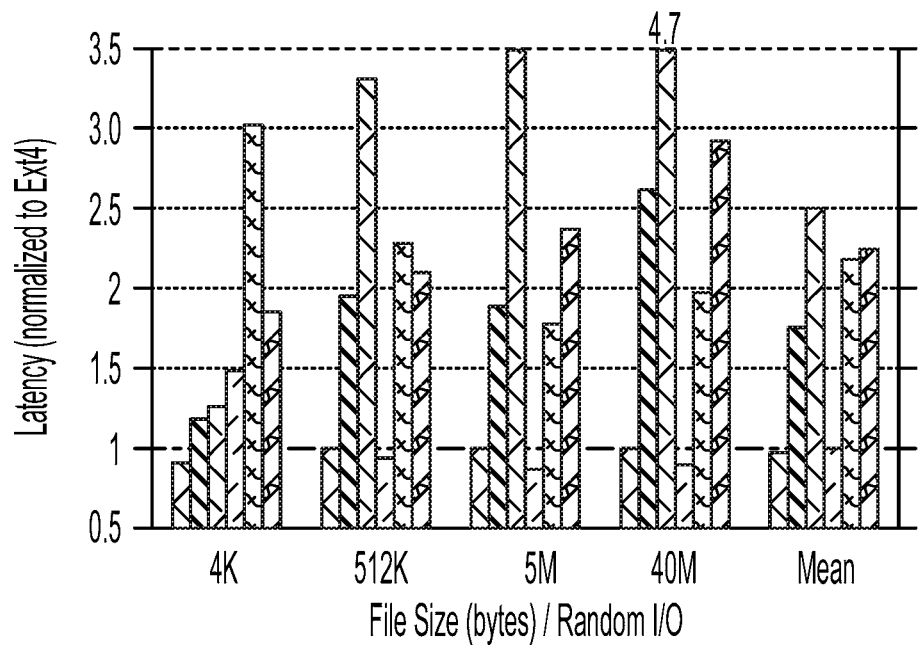
FIG. 9B illustrates performance results, in accordance with example embodiments.

FIGS. 8A and 8C provide an expanded performance profile, testing a gamut of filesystems broken down by workload file size. For sequential reads across all filesystems and file sizes, the implementations herein outperform dm-crypt. This is true even on the non-LFS Ext4 filesystems. Specifically, read performance improvements over dm-crypt AES-XTS for 40-megabyte sequential reads are 2.02× for NILFS, 2.07x for F2FS, 2.09× for Ext4 in ordered journaling mode, and 2.06× for Ext4 in full journaling mode. For smaller file sizes, the performance improvement is less pronounced. For 4-kilobyte reads, the improvements are 1.28× for NILFS, 1.03× for F2FS, 1.07× for Ext4 in ordered journaling mode, and 1.04× for Ext4 in full journaling mode. When it comes to random reads, there are virtually identical results save for 4-kilobyte reads, where dm-crypt proved very slightly more performant under the NILFS LFS at 1.12×. This behavior is not observed with the more modern F2FS.

D. Write Performance

FIGS. 7A and 7B show the performance of the embodiments herein in comparison to dm-crypt under the modern F2FS LFS broken down by workload file size. Similar to read performance under the F2FS, these embodiments improve on the performance of dm-crypt's AES-XTS implementation across sequential and random write operations on all file sizes. Hence, the embodiments herein under F2FS are holistically faster than dm-crypt under F2FS. Specifically, the improvements are 1.33× for sequential 40-megabyte writes, 1.21× for sequential 5-megabyte writes, 1.15× for sequential 512-kilobyte writes, and 1.19× for sequential 4-kilobyte writes.

Figure 8D:
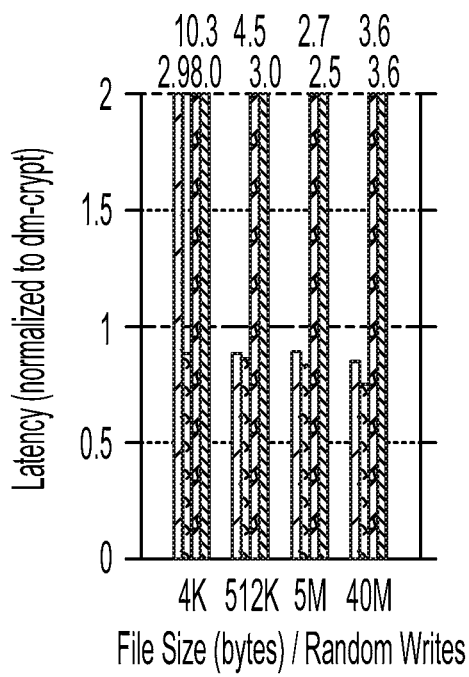
FIG. 8D illustrates performance results, in accordance with example embodiments.

FIGS. 8B and 8D show an expanded performance profile, testing a gamut of filesystems broken down by workload file size. Unlike read performance, write performance under certain filesystems shows some improvements but not for all tests. For 40-megabyte sequential writes, the embodiments herein outperform dm-crypt's AES-XTS implementation by 1.33× for F2FS and 1.18× for NILFS. When it comes to Ext4, write performance drops, with a 3.6× slowdown for both ordered journaling and full journaling modes. For non-LFS 4-kilobyte writes, the performance degradation is even more pronounced with a 8.09× slowdown for ordered journaling and 14.5× slowdown for full journaling.

This slowdown occurs in Ext4 because, while writes from non-LFS filesystems have a metadata overhead that is comparable to that of forward writes in an LFS filesystem, Ext4 is not an append-only or append-mostly filesystem. This means that, at any time, Ext4 will initiate one or more overwrites anywhere on the disk (see Table 1). As described above, overwrites, once detected, trigger the rekeying process, which is a relatively expensive operation. Multiple overwrites compound this expense further. This makes Ext4 and other filesystems that do not exhibit at least append-mostly behavior likely unsuitable for use with the embodiments herein.

For both sequential and random 4-kilobyte writes among the LFSs, the performance improvement over dm-crypt's AES-XTS implementation for LFSs deflates. For the more modern F2FS atop the embodiments herein, there is a 1.19× improvement. For the older NILFS filesystem atop the embodiments herein, there is a 2.38× slowdown. This is where the overhead associated with tracking writes and detecting overwrites potentially becoming problematic, though the overhead is negligible depending on choice of LFS and workload characteristics.

These results show that the embodiments herein are sensitive to the behavior of the LFS that is mounted atop it, and that any practical use would require an extra profiling step to determine which LFS works best with a specific workload. With the correct selection of LFS, such as F2FS for workloads dominated by small write operations, potential slowdowns when compared to mounting that same filesystem over dm-crypt's AES-XTS can be effectively mitigated.

E. Replacing dm-crypt and Ext4

FIGS. 9A and 9B show the performance benefit of using the embodiments herein with F2FS over the popular dm-crypt with Ext4 in ordered journaling mode combination for both sequential and random read and write operations of various sizes. Other than 4-kilobyte write operations, which is an instance where baseline F2FS without modification is simply slower than baseline Ext4 without dm-crypt, the embodiments herein with F2FS outperforms dm-crypt's AES-XTS implementation with Ext4.

These results show that configurations taking advantage of the popular combination of dm-crypt, AES-XTS, and Ext4 could see a significant improvement in read performance without a degradation in write performance except in cases where small (>512 kilobyte) writes dominate the workload.

Note, however, that several implicit assumptions exist in the above design. For one, it is presumed that there is ample memory at hand to house the Merkle Tree and all other data abstractions. Efficient memory use was not a goal of the implementation. In an implementation aiming to be production ready, much more memory efficient data structures would be utilized.

It is also for this reason that populating the Merkle Tree necessitates a rather lengthy mounting process. In tests, a 1-gigabyte backing store on the Odroid system can take as long as 15 seconds to mount.

F. ChaCha20 vs. AES Performance

FIGS. 7A-8D give strong evidence for general performance improvement over dm-crypt not being an artifact of filesystem choice. Excluding Ext4 as a non-LFS filesystem, tests show that the embodiments herein outperform dm-crypt under an LFS filesystem in the vast majority of outcomes.

Figure 10:
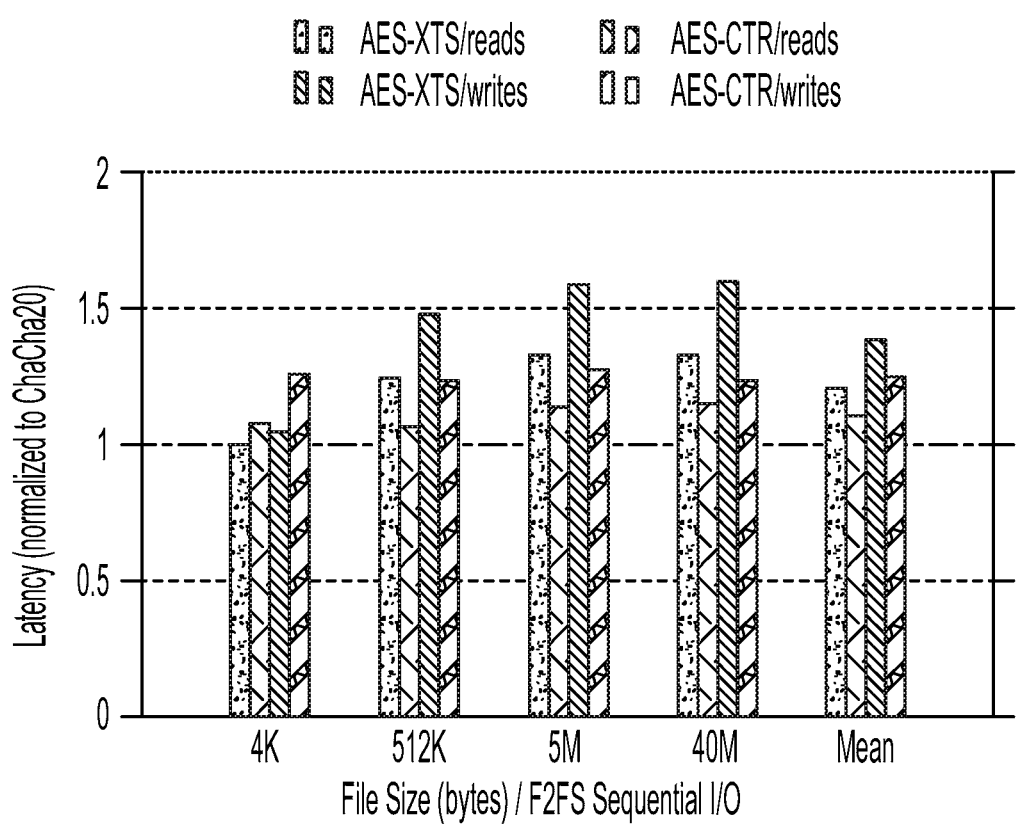
FIG. 10 illustrates performance results, in accordance with example embodiments.

FIG. 10 depicts the relationship between ChaCha20, the stream cipher used in the tested implementation, and the AES cipher. The dm-crypt module implements AES in XTS mode to provide full-disk encryption functionality. Swapping out ChaCha20 for AES-CTR (AES in CTR mode makes AES act as if it was a stream cipher) resulted in slowdowns of up to 1.33× for reads and 1.15× for writes across all configurations, as shown in FIG. 10.

Finally, tests were carried out to determine whether the general performance improvement can be attributed to the implementation of the embodiments herein rather than the choice of stream cipher. This was tested by implementing AES in XTS mode on top of the embodiments herein using OpenSSL EVP. This use of OpenSSL AES-XTS experiences slowdowns of up to 1.6× for reads and 1.23× for writes across all configurations compared to using ChaCha20. Interestingly, while significantly less performant, this slowdown is not entirely egregious, and suggests that perhaps there are parts of the dm-crypt code base that would benefit from further optimization.

G. Threat Analysis

Table 3 lists possible attacks and their results. It can be inferred from these results and the design described herein that the threat model is addressed and confidentiality and integrity guarantees are maintained.

TABLE 3

| Attack | Result | Explanation |
| --- | --- | --- |
| Nugget user data in backing store is mutated out-of-band online. | The system immediately fails with exception on successive I/O request. | The MTRH is inconsistent. |
| Header metadata in backing store is mutated out-of-band online, making the MTRH inconsistent. | The system immediately fails with exception on successive I/O request. | The MTRH is inconsistent. |
| Backing store is rolled back to a previously consistent state while online. | The system immediately fails with exception on successive I/O request. | TPMGLOBALVER and RPMB secure counter out of sync. |
| Backing store is rolled back to a previously consistent state while offline, RPMB secure counter wildly out of sync. | The system refuses to mount; allows for force mount with root access. | TPMGLOBALVER and RPMB secure counter out of sync. |
| MTRH made inconsistent by mutating backing store out-of-band while offline, RPMB secure counter in sync. | The system refuses to mount. | TPMGLOBALVER and RPMB secure counter are in sync, yet illegal data manipulation occurred. |

H. Improvements Summarized

The conventional wisdom is that securing data at rest requires that one must pay the high performance overhead of encryption with AES is XTS mode. The embodiments herein demonstrate that technological trends overturn this conventional wisdom: log-structured file systems and hardware support for secure counters make it practical to use a stream cipher to secure data at rest. In particular, an implementation which uses the ChaCha20 stream cipher and the Poly1305 MAC to provide secure storage can be used as a drop-in replacement for dm-crypt. Empirical results show that under F2FS, a modern, industrial-strength log-structured file system, the embodiments herein provide upwards of 2× improvement on read performance and 1.21× improvement on write performance. In fact, these results show such a system provides a higher performance replacement for Ext4 backed with dm-crypt.

VI. Example Operations

Figure 11A:
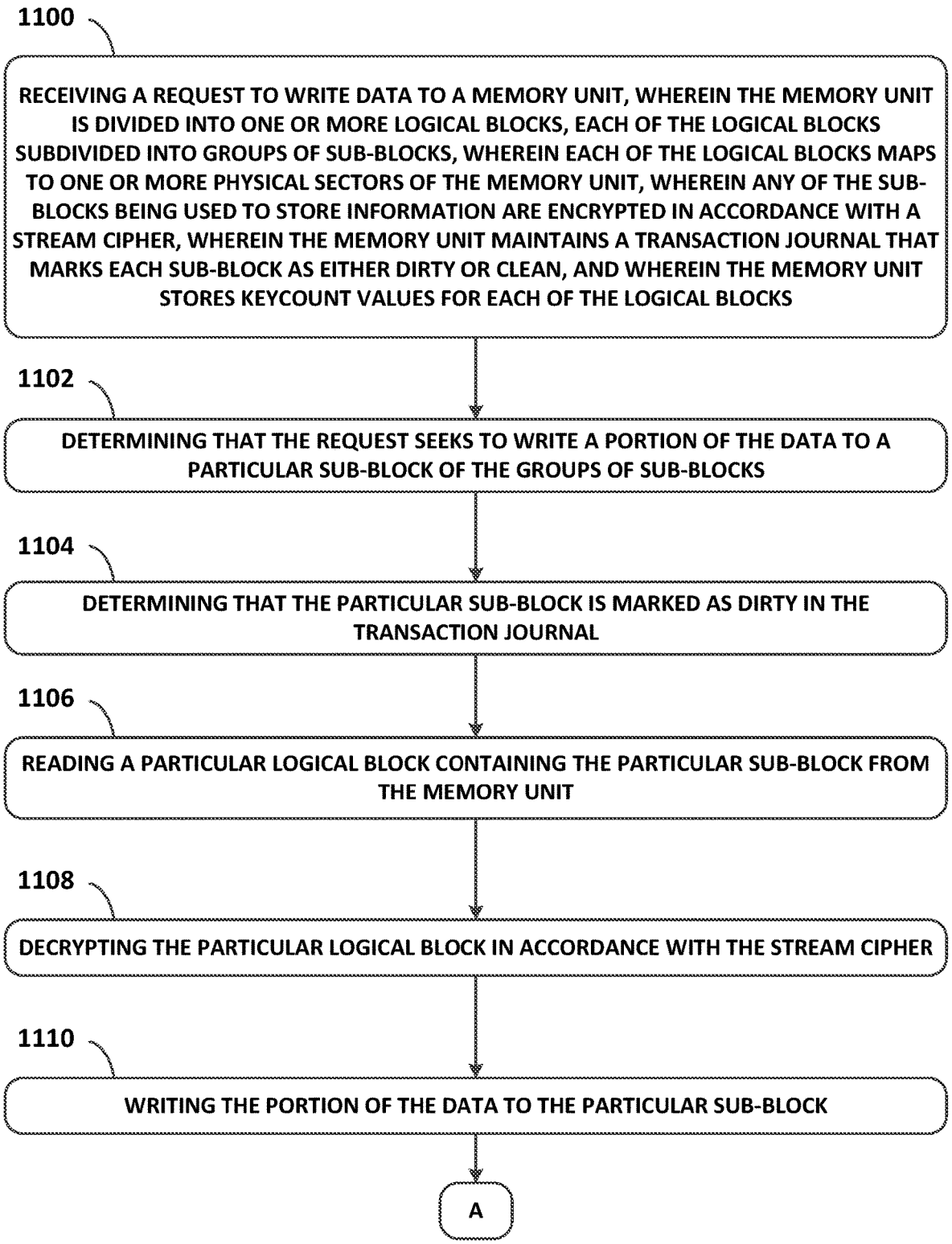
FIGS. 11A and 11B depict a flow chart, in accordance with example embodiments.
Figure 11B:
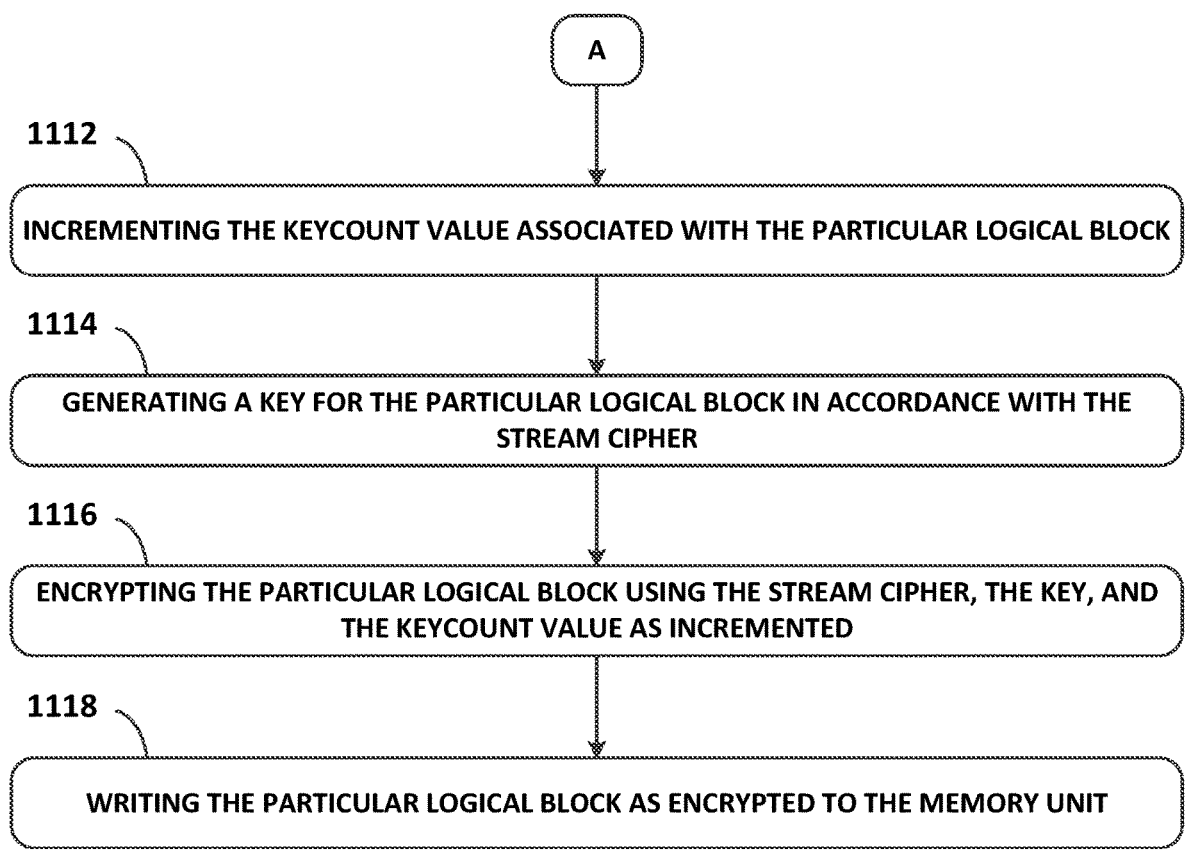

FIGS. 11A and 11B depict a flow chart illustrating an example embodiment. The process illustrated by FIGS. 11A and 11B may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device, or a smartphone.

The embodiments of FIGS. 11A and 11B may be simplified by the removal of any one or more of the features shown therein. Further, these embodiments may be combined with features, aspects, and/or implementations of any of the previous figures or otherwise described herein.

In this section, a nugget is referred to as a "logical block" and a flake is referred to as a "sub-block." This terminology is used for clarity and precision.

In FIG. 11A, step 1100 involves receiving a request to write data to a memory unit. The memory unit may be divided into one or more logical blocks, each of the logical blocks subdivided into groups of sub-blocks. Each of the logical blocks maps to one or more physical sectors of the memory unit. Any of the sub-blocks being used to store information are encrypted in accordance with a stream cipher. The memory unit maintains a transaction journal that marks each sub-block as either dirty or clean. The memory unit stores keycount values for each of the logical blocks.

Step 1102 involves determining that the request seeks to write a portion of the data to a particular sub-block of the groups of sub-blocks.

Step 1104 involves determining that the particular sub-block is marked as dirty in the transaction journal.

Step 1106 involves reading a particular logical block containing the particular sub-block from the memory unit.

Step 1108 involves decrypting the particular logical block in accordance with the stream cipher.

Step 1110 involves writing the portion of the data to the particular sub-block.

Turning to FIG. 11B, step 1112 involves incrementing the keycount value associated with the particular logical block.

Step 1114 involves generating a key for the particular logical block in accordance with the stream cipher.

Step 1116 involves encrypting the particular logical block using the stream cipher, the key, and the keycount value as incremented.

Step 1118 involves writing the particular logical block as encrypted to the memory unit.

Some embodiments may involve further steps of: receiving a second request to write second data to the memory unit, determining that the second request seeks to write a portion of the second data to a second particular sub-block of the groups of sub-blocks, determining that the second particular sub-block is not marked as dirty in the transaction journal, marking the second particular sub-block as dirty in the transaction journal, reading a second particular logical block containing the second particular sub-block from the memory unit, decrypting the second particular logical block in accordance with the stream cipher, writing the portion of the second data to the second particular sub-block, generating a second key for the second particular logical block in accordance with the stream cipher, encrypting the second particular logical block using the stream cipher, second key, and a second keycount value associated with the second particular logical block, and writing the second particular logical block as encrypted to the memory unit.

In some embodiments, a hash tree contains hash outputs of each of the sub-blocks, and further steps may involve: after reading the particular logical block from the memory unit, validating the particular sub-block with the hash output associated with the particular sub-block, and after writing the particular logical block as encrypted to the memory unit, calculating a new hash output for the particular sub-block and updating the hash tree to associate the new hash output with the particular sub-block. The hash tree may be stored in the memory unit. The hash tree may be a Merkle Tree.

In some embodiments, the memory unit also maintains a rekeying journal that temporarily stores the particular logical block as decrypted until the particular logical block as encrypted is written to the memory unit.

Some embodiments may also include a replay protected memory block (RPMB) that stores a persistent monotonic counter, and further steps may involve: after writing the particular logical block as encrypted to the memory unit, updating the persistent monotonic counter in the RPMB, and storing a copy of the persistent monotonic counter in the memory unit. In some embodiments, the system may not initialize for non-privileged users if the persistent monotonic counter in the RPMB is not identical to the copy of the persistent monotonic counter in the memory unit.

Some embodiments may also include an operating system configured to access the memory unit by way of the cryptographic software module. The operating system may overlay a log-structured file system (or other types of file systems) atop of the memory unit. The file system may be based on F2FS.

Some embodiments may involve a master secret, and generating the key for the particular logical block in accordance with the stream cipher may involve generating the key based in part on the master secret. The stream cipher may be based on ChaCha20, for example.

VII. Additional Embodiments and Performance Results

The additional embodiments described in this section can be combined with any one or more of the previously-described embodiments.

In the embodiments above, it was shown that recent developments in mobile hardware invalidate the assumption that stream ciphers are unsuitable for FDE. Thus, fast stream ciphers can be used to dramatically improve the performance of FDE. In particular, modern mobile devices employ solid-state storage with FTL, which operate similarly to an LFS. They also include trusted hardware such as TEEs and secure storage areas. Embodiments using the ChaCha20 stream cipher leveraged these two trends to outperform dm-crypt, the de-facto Linux FDE endpoint.

In this section, embodiments using stream ciphers beyond ChaCha20 and AES-CTR are explored. Specifically, the following eSTREAM profile 1 stream ciphers (suitable for software applications with high throughput requirements) were considered: Sosemanuk, Rabbit, Salsa20, Salsa12, and Salsa8. ChaCha8/12 are not considered eSTREAM ciphers and so were not included in this comparison (but were included in later experimental implementations). Further, eSTREAM profile 2 stream ciphers were not explicitly considered but could potentially produce improved performance as well. In various embodiments, other stream ciphers or block ciphers with stream-cipher-like characteristics may be used.

A. Experimental Setup

Experiments were performed on a Hardkernel Odroid XU3 ARM big.LITTLE system (Samsung Exynos5422 A15 and A7 quad core CPUs, 2Gbyte LPDDR3 RAM, eMMC5.0 HS400 backing store) running Ubuntu Trusty 14.04 LTS, kernel version 3.10.58. To evaluate performance under these new ciphers, measurements included the latency (time per operation) of sequential read and write I/O operations against the F2FS LFS. The I/O operations were performed using 1 KiB and 5 MiB file sizes (where 1 KiB=$2^{10}$ bytes and 1 MiB=$2^{20}$ bytes). These files were populated with random data. The experiments are conducted using a standard Linux ramdisk (tmpfs) as the ultimate backing store. The I/O size used was the maximum that the Odroid XU3 kernel version 3.10.58 supports, selected by the operating system automatically.

B. Evaluation

For each of the figures in this section, the metrics indicate averages (medians) of 10 runs over the whole size of the file. Note that, except in the case of Salsa12, in figures where energy/power data is missing is due to the coarse timing resolution of current energy monitoring tools. Unfortunately, these specific tools cannot be easily made to operate at a faster frequency.

Figure 12A:
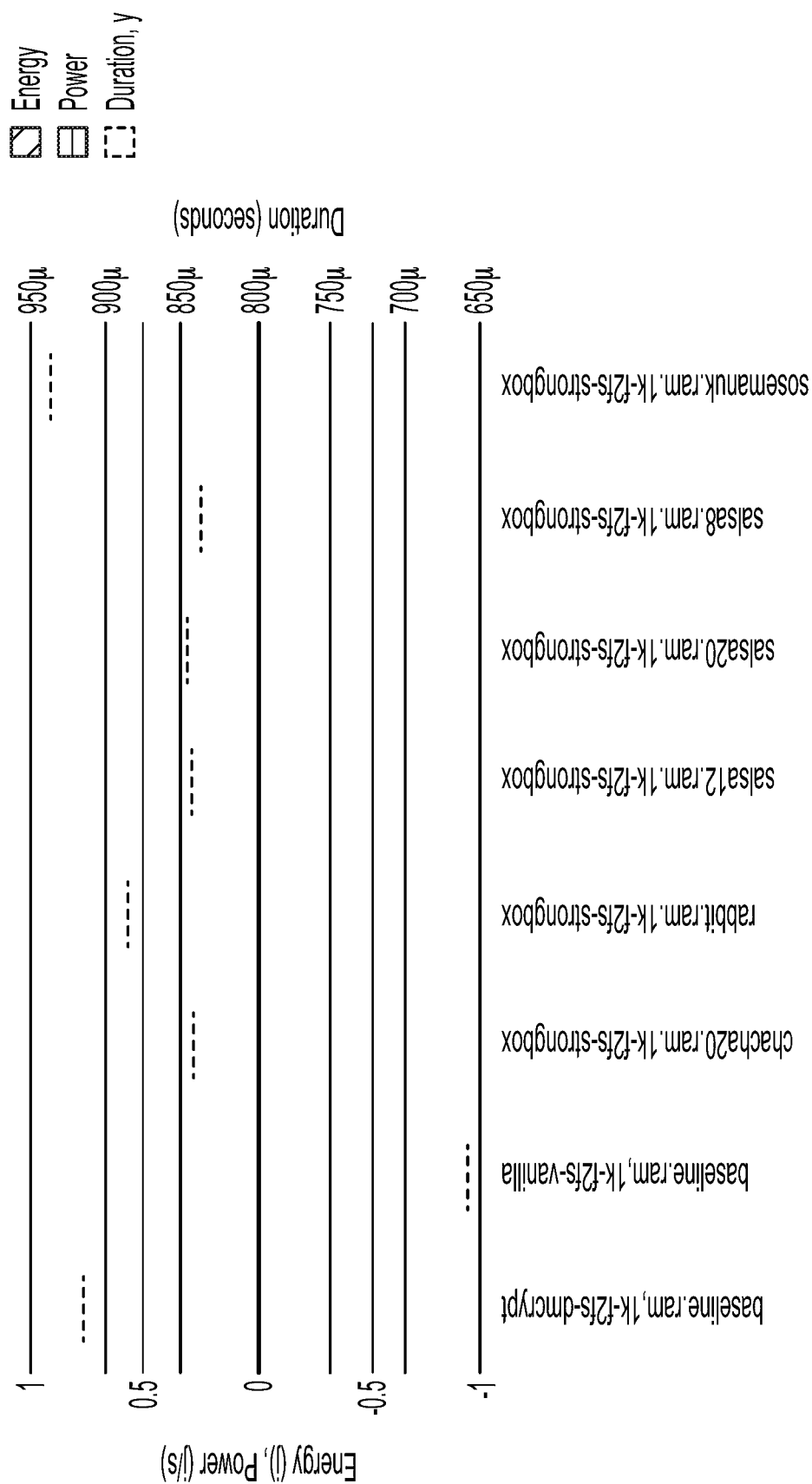
FIG. 12A illustrates performance results, in accordance with example embodiments.

FIG. 12A shows the performance of dm-crypt for 1 KiB whole file reads in comparison to the previous embodiments herein (which are again referred to interchangeably as "StrongBox") implemented with several stream ciphers, including use of the original ChaCha20 stream cipher. ChaCha20 is on average 1.09× faster than dm-crypt for reads at this file size, which is congruous with the results above. Sosemanuk is the worst performer, being 1.15× slower than ChaCha20. ChaCha20 is 1.01× faster than Salsa20 but 1.01× slower than Salsa8 and virtually maintains latency parity with Salsa 12. ChaCha20 is 1.05× faster than Rabbit.

Figure 12B:
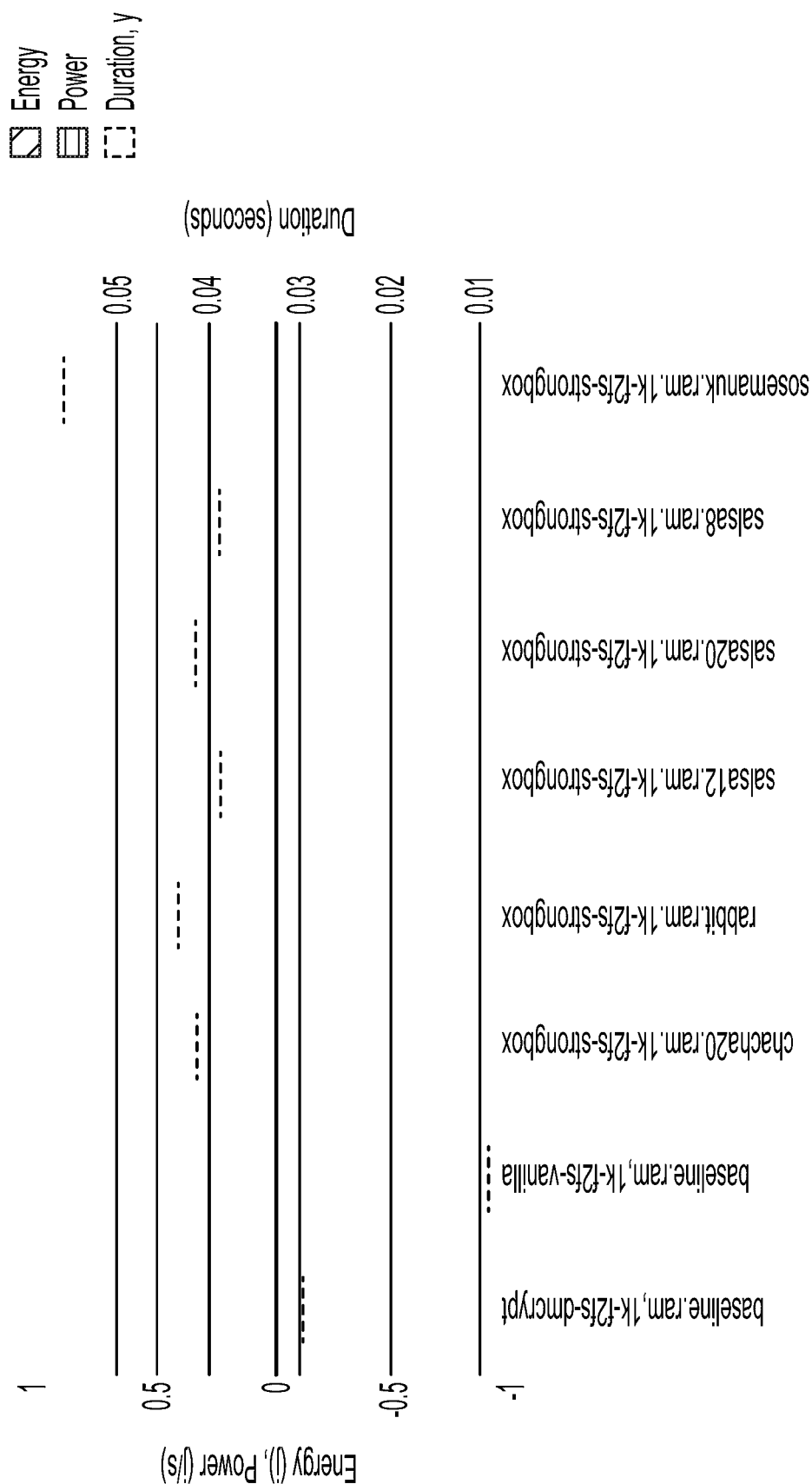
FIG. 12B illustrates performance results, in accordance with example embodiments.

FIG. 12B shows the performance of dm-crypt for 1 KiB whole file writes in comparison to the embodiments herein implemented with several stream ciphers. On average, dm-crypt is 1.41 × faster than ChaCha20 for writes at this file size. Still, ChaCha20 is 1.05× faster than Rabbit, and 1.36× faster than Sosemanuk. Salsa20 is slightly slower than ChaCha20 at 1.01×. Salsa12 is 1.07× faster than ChaCha20. Salsa8 is 1.07× faster than ChaCha20.

Figure 12C:
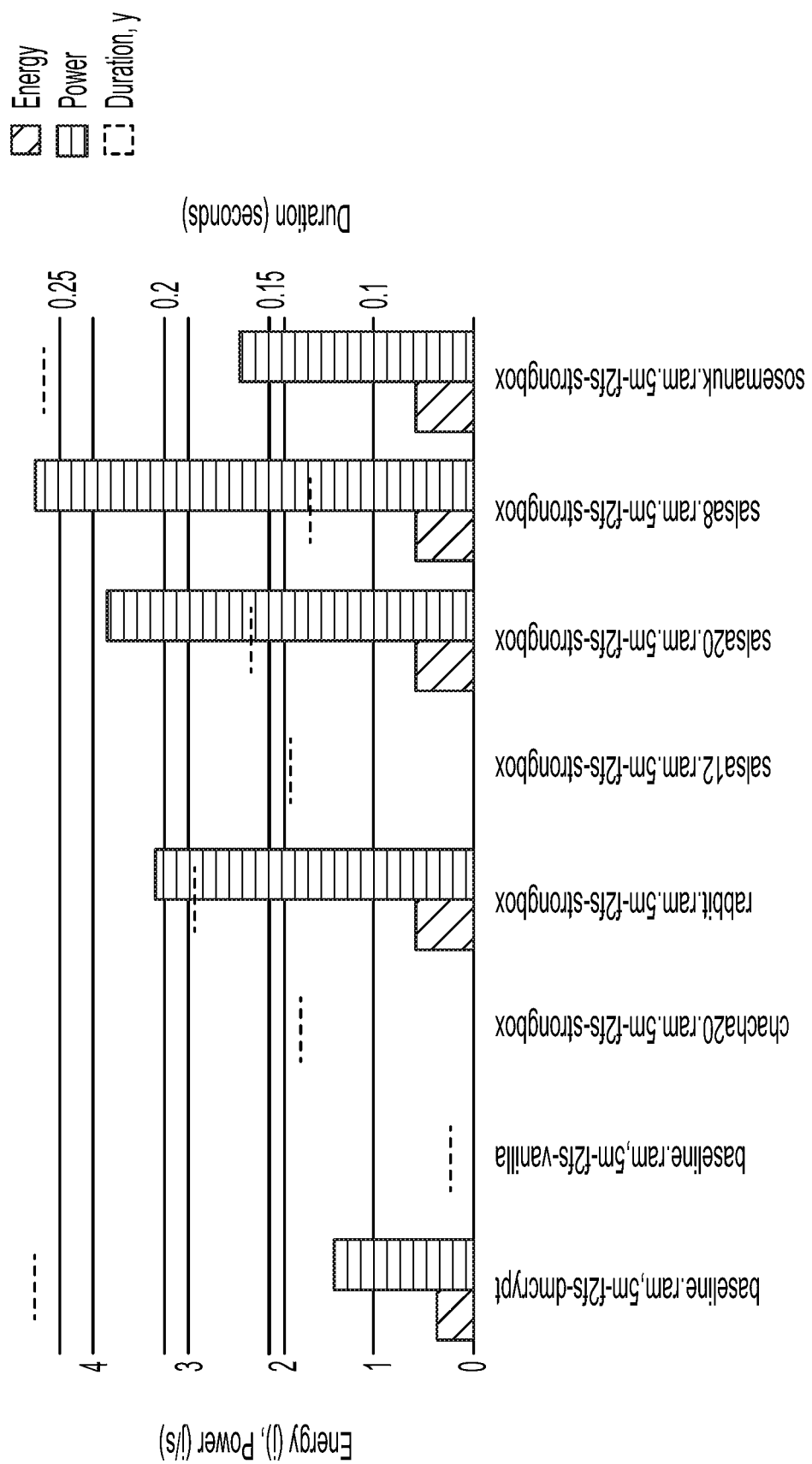
FIG. 12C illustrates performance results, in accordance with example embodiments.

Similar to FIG. 12A, FIG. 12C shows the performance of dm-crypt against the embodiments herein, but for 5 MiB whole file reads. ChaCha20 is 1.95× faster than dm-crypt for reads at this file size, which is congruous with the results above. The only cipher faster than ChaCha20 at this size is Salsa8, which is 1.03× faster than ChaCha20. Sosemanuk virtually maintains latency parity with dm-crypt in that it is 1.95× slower than ChaCha20 at this size. ChaCha20 is 1.04× faster than Salsa12. ChaCha20 is 1.18× faster than Salsa20. ChaCha20 is 1.3 8× faster than Rabbit.

Figure 12D:
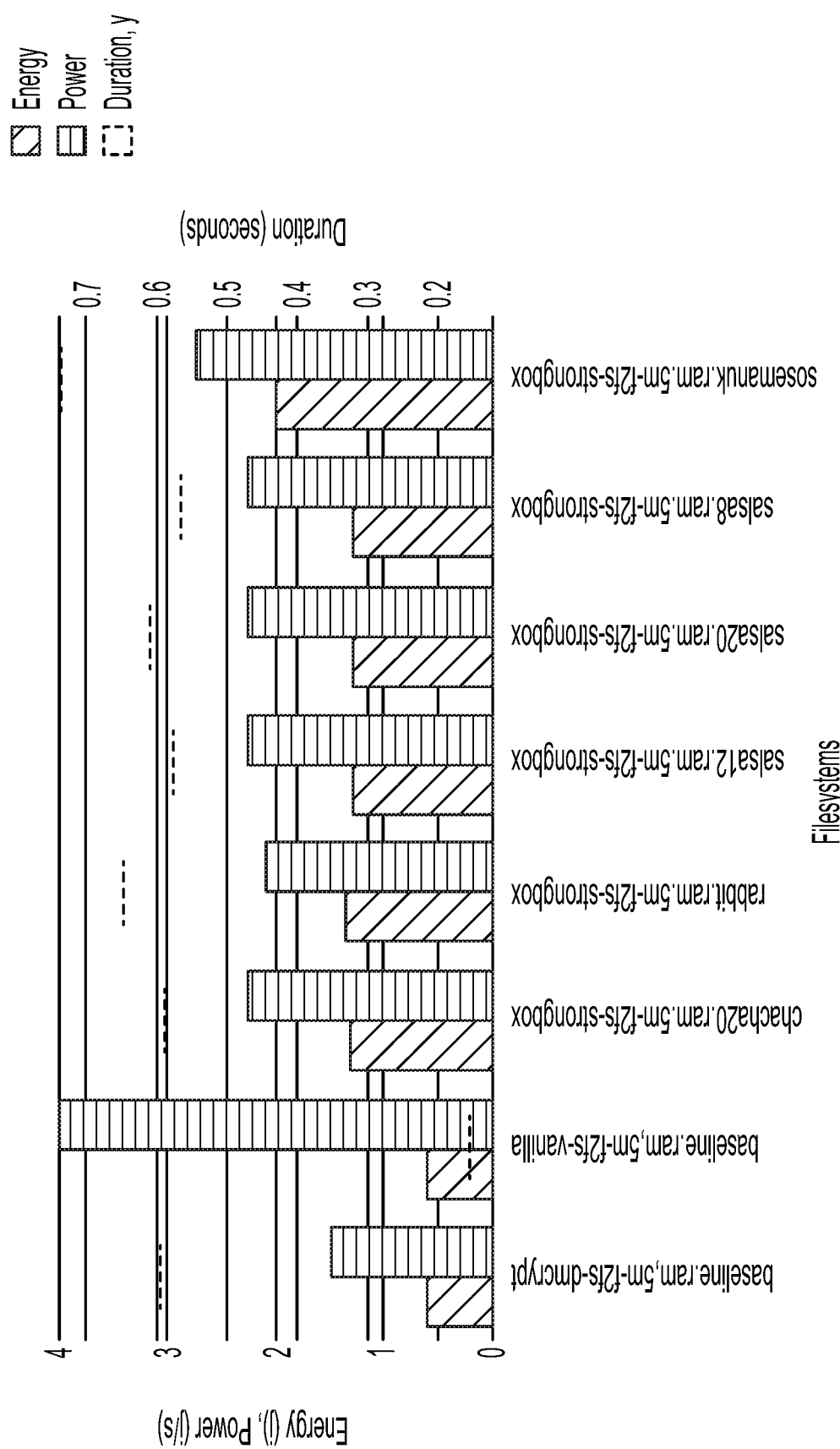
FIG. 12D illustrates performance results, in accordance with example embodiments.

Similar to FIG. 12B, FIG. 12D shows the performance of dm-crypt against the embodiments herein for 5 MiB whole file writes. Here, ChaCha20 is 1.02× faster than dm-crypt for writes at this file size. ChaCha20 is 1.10× faster than Rabbit. ChaCha20 is 1.25× faster than Sosemanuk. ChaCha20 is 1.04× faster than Salsa20. Salsa12 is 1.02× faster than ChaCha20, while Salsa8 is 1.04× faster than ChaCha20.

Evident from the above is the fact that writes have slowed down for StrongBox based implementations. This slowdown is most likely due to the new software layer used to facilitate cipher switching that was added for the measurements of FIGS. 12A-12D. Fortunately, the slowdown only seems to affect writes. The performance win with ChaCha20 reads over dm-crypt remains nearly two-to-one. One solution that immediately presents itself is to improve these embodiments by offloading I/O operations to an (un)bounded thread pool, which is a distinct advantage the production-ready dm-crypt software current employs.

The SalsaX (Salsa20, Salsa12, Salsa8) functions outperforming ChaCha20 by a small factor in most instances above comes with a heavy caveat: increased or otherwise unusual energy/power use. In several cases, such as with FIG. 12C, the performance win might be entirely outweighed by the efficiency loss, depending on the use case scenario. This was not entirely unexpected, since the reasons for the ChaChaX family of alternative implementations being created in the first place included increased energy efficiency. The ramifications of cipher selection on total system energy use are of paramount concern in many practical scenarios.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
  a memory unit divided into one or more logical blocks, each of the logical blocks subdivided into groups of sub-blocks, wherein each of the logical blocks maps to one or more physical sectors of the memory unit, wherein any of the sub-blocks being used to store information are encrypted in accordance with a stream cipher, wherein the memory unit maintains a transaction journal that marks each sub-block as either dirty or clean, and wherein the memory unit stores keycount values for each of the logical blocks; and
  a cryptography software module, configured to perform operations comprising:
    receiving a request to write data to the memory unit,
    determining that the request seeks to write a portion of the data to a particular sub-block of the groups of sub-blocks,
    determining that the particular sub-block is marked as dirty in the transaction journal, and
    based on the particular sub-block being marked as dirty:
      reading a particular logical block containing the particular sub-block from the memory unit,
      decrypting the particular logical block in accordance with the stream cipher,
      writing the portion of the data to the particular sub-block, incrementing the keycount value associated with the particular logical block,
      generating a key for the particular logical block in accordance with the stream cipher,
      encrypting the particular logical block using the stream cipher, the key, and the keycount value as incremented, and
      writing the particular logical block as encrypted to the memory unit.

2. The system of claim 1, wherein the cryptography software module is further configured to perform operations comprising:
  receiving a second request to write second data to the memory unit;
  determining that the second request seeks to write a portion of the second data to a second particular sub-block of the groups of sub-blocks;
  determining that the second particular sub-block is not marked as dirty in the transaction journal; and
  based on the second particular sub-block being not marked as dirty:
    marking the second particular sub-block as dirty in the transaction journal;
    reading a second particular logical block containing the second particular sub-block from the memory unit;
    decrypting the second particular logical block in accordance with the stream cipher;
    writing the portion of the second data to the second particular sub-block;
    encrypting the second particular logical block in accordance with the stream cipher; and
    writing the second particular logical block as encrypted to the memory unit.

3. The system of claim 1, wherein the cryptography software module has access to a hash tree that contains hash outputs of each of the sub-blocks, and wherein the cryptography software module is further configured to perform operations comprising:
  after reading the particular logical block from the memory unit, validating the particular sub-block with the hash output associated with the particular sub-block; and
  after writing the particular logical block as encrypted to the memory unit, calculating a new hash output for the particular sub-block and updating the hash tree to associate the new hash output with the particular sub-block.

4. The system of claim 3, wherein the hash tree is stored in the memory unit.

5. The system of claim 3, wherein the hash tree is a Merkle Tree.

6. The system of claim 1, wherein the memory unit also maintains a rekeying journal that temporarily stores the particular logical block as decrypted until the particular logical block as encrypted is written to the memory unit.

7. The system of claim 1, further comprising a replay protected memory block (RPMB) that stores a persistent monotonic counter, wherein the cryptography software module is further configured to perform operations comprising:
  after writing the particular logical block as encrypted to the memory unit, updating the persistent monotonic counter in the RPMB; and
  storing a copy of the persistent monotonic counter in the memory unit.

8. The system of claim 7, wherein the cryptography software module will not initialize for non-privileged users if the persistent monotonic counter in the RPMB is not identical to the copy of the persistent monotonic counter in the memory unit.

9. The system of claim 1, further comprising:
an operating system configured to access the memory unit by way of the cryptographic software module.

10. The system of claim 9, wherein the operating system overlays a log-structured file system atop of the memory unit.

11. The system of claim 10, wherein the log-structured file system is based on F2FS.

12. The system of claim 1, wherein the cryptographic software module has access to a master secret, and wherein generating the key for the particular logical block in accordance with the stream cipher comprises generating the key based in part on the master secret.

13. The system of claim 1, wherein the stream cipher is based on ChaCha20.

14. A computer-implemented method comprising:
receiving a request to write data to a memory unit, wherein the memory unit is divided into one or more logical blocks, each of the logical blocks subdivided into groups of sub-blocks, wherein each of the logical blocks maps to one or more physical sectors of the memory unit, wherein any of the sub-blocks being used to store information are encrypted in accordance with a stream cipher, wherein the memory unit maintains a transaction journal that marks each sub-block as either dirty or clean, and wherein the memory unit stores keycount values for each of the logical blocks;
determining that the request seeks to write a portion of the data to a particular sub-block of the groups of sub-blocks;
determining that the particular sub-block is marked as dirty in the transaction journal; and
based on the particular sub-block being marked as dirty:
reading a particular logical block containing the particular sub-block from the memory unit;
decrypting the particular logical block in accordance with the stream cipher;
writing the portion of the data to the particular sub-block;
incrementing the keycount value associated with the particular logical block;
generating a key for the particular logical block in accordance with the stream cipher;
encrypting the particular logical block using the stream cipher, the key, and the keycount value as incremented; and
writing the particular logical block as encrypted to the memory unit.

15. The computer-implemented method of claim 14, further comprising:
receiving a second request to write second data to the memory unit;
determining that the second request seeks to write a portion of the second data to a second particular sub-block of the groups of sub-blocks;
determining that the second particular sub-block is not marked as dirty in the transaction journal; and
based on the second particular sub-block being not marked as dirty:
marking the second particular sub-block as dirty in the transaction journal;
reading a second particular logical block containing the second particular sub- block from the memory unit;
decrypting the second particular logical block in accordance with the stream cipher;
writing the portion of the second data to the second particular sub-block;
encrypting the second particular logical block in accordance with the stream cipher; and
writing the second particular logical block as encrypted to the memory unit.

16. The computer-implemented method of claim 14, wherein a hash tree contains hash outputs of each of the sub-blocks, the method further comprising:
after reading the particular logical block from the memory unit, validating the particular sub-block with the hash output associated with the particular sub-block; and
after writing the particular logical block as encrypted to the memory unit, calculating a new hash output for the particular sub-block and updating the hash tree to associate the new hash output with the particular sub-block.

17. The computer-implemented method of claim 14, wherein the memory unit also maintains a rekeying journal that temporarily stores the particular logical block as decrypted until the particular logical block as encrypted is written to the memory unit.

18. The computer-implemented method of claim 14, wherein a replay protected memory block (RPMB) stores a persistent monotonic counter, the method further comprising:
after writing the particular logical block as encrypted to the memory unit, updating the persistent monotonic counter in the RPMB; and
storing a copy of the persistent monotonic counter in the memory unit.

19. The computer-implemented method of claim 18, wherein a cryptography software module performs all reads to and writes from the memory unit, and wherein the cryptography software module will not initialize for non-privileged users if the persistent monotonic counter in the RPMB is not identical to the copy of the persistent monotonic counter in the memory unit.

20. An article of manufacture including a non-transitory computer-readable medium, having stored thereon program instructions that, upon execution by a computing system, cause the computing system to perform operations comprising:
receiving a request to write data to a memory unit of the computing system, wherein the memory unit is divided into one or more logical blocks, each of the logical blocks subdivided into groups of sub-blocks, wherein each of the logical blocks maps to one or more physical sectors of the memory unit, wherein any of the sub-blocks being used to store information are encrypted in accordance with a stream cipher, wherein the memory unit maintains a transaction journal that marks each sub-block as either dirty or clean, and wherein the memory unit stores keycount values for each of the logical blocks;
determining that the request seeks to write a portion of the data to a particular sub-block of the groups of sub-blocks;
determining that the particular sub-block is marked as dirty in the transaction journal; and
based on the particular sub-block being marked as dirty:
reading a particular logical block containing the particular sub-block from the memory unit;
decrypting the particular logical block in accordance with the stream cipher;
writing the portion of the data to the particular sub-block;
incrementing the keycount value associated with the particular logical block;

generating a key for the particular logical block in accordance with the stream cipher;

encrypting the particular logical block using the stream cipher, the key, and the keycount value as incremented; and writing the particular logical block as encrypted to the memory unit.

\* \* \* \* \*